United States Patent [19]
van der Lely et al.

[11] Patent Number: 4,763,844
[45] Date of Patent: Aug. 16, 1988

[54] SPREADING MATERIAL ON A SURFACE

[75] Inventors: Cornelis van der Lely, Zug, Switzerland; Ary van der Lely, Maasland; Cornelis J. G. Bom, Rozenburg, both of Netherlands

[73] Assignee: C. Van der Lely N. V., Maasland, Netherlands

[21] Appl. No.: 668,377

[22] PCT Filed: May 30, 1984

[86] PCT No.: PCT/NL84/00015
§ 371 Date: Sep. 27, 1984
§ 102(e) Date: Sep. 27, 1984

[87] PCT Pub. No.: WO84/04868
PCT Pub. Date: Dec. 20, 1984

[30] Foreign Application Priority Data
Jun. 3, 1983 [NL] Netherlands ............... 8301973
Jul. 4, 1983 [NL] Netherlands ............... 8302365

[51] Int. Cl.$^4$ ............................. A01C 19/00
[52] U.S. Cl. .................... 239/665; 239/667; 74/526
[58] Field of Search ............... 239/665–667, 239/650, 673, 682, 687, 661; 74/526

[56] References Cited
U.S. PATENT DOCUMENTS

| | | | |
|---|---|---|---|
| 2,775,517 | 2/1956 | Chambers et al. | |
| 3,125,897 | 3/1964 | Zeman | 74/526 X |
| 3,279,801 | 10/1966 | Meyer | |
| 3,473,739 | 9/1969 | Singleton | |
| 3,610,539 | 10/1971 | van der Lely | 239/657 |
| 3,643,872 | 6/1972 | Smith | 239/655 |
| 3,652,019 | 3/1972 | van der Lely | 239/682 |
| 3,806,042 | 4/1974 | van der Lely | 239/658 |
| 3,866,857 | 2/1975 | Ciastula | 74/526 X |
| 3,899,138 | 8/1975 | van der Lely et al. | 239/661 |
| 4,008,854 | 2/1977 | van der Lely et al. | 239/655 |
| 4,019,753 | 6/1977 | Kestel | 280/415 |
| 4,205,793 | 6/1980 | van der Lely | 239/682 |
| 4,316,581 | 2/1982 | van der Lely et al. | 239/682 |
| 4,465,211 | 8/1984 | van der Lely et al. | 239/661 X |
| 4,497,446 | 4/1985 | van der Lely et al. | 239/661 |

FOREIGN PATENT DOCUMENTS

| | | |
|---|---|---|
| 265723 | 10/1968 | Austria . |
| 345172 | 4/1978 | Austria . |
| 0015795 | 8/1980 | European Pat. Off. . |
| 0088480 | 9/1982 | European Pat. Off. . |
| 0080239 | 11/1982 | European Pat. Off. . |
| 845117 | 7/1949 | Fed. Rep. of Germany . |
| 7023962 | 4/1950 | Fed. Rep. of Germany . |
| 1180562 | 10/1964 | Fed. Rep. of Germany . |
| 2031557 | 12/1971 | Fed. Rep. of Germany . |
| 2041804 | 2/1972 | Fed. Rep. of Germany . |
| 2533814 | 5/1976 | Fed. Rep. of Germany . |
| 2652914 | 1/1977 | Fed. Rep. of Germany . |
| 2628798 | 8/1977 | Fed. Rep. of Germany . |
| 1532894 | 1/1968 | France . |
| 2388479 | 3/1978 | France . |
| 6508898 | 1/1966 | Netherlands . |
| 6700285 | 7/1968 | Netherlands . |
| 7606450 | 7/1975 | Netherlands . |
| 7810805 | 10/1978 | Netherlands . |
| 8104119 | 6/1986 | Netherlands . |
| 96310 | 4/1947 | New Zealand . |
| 120867 | 3/1958 | New Zealand . |
| 586054 | 3/1947 | United Kingdom . |
| 617747 | 2/1949 | United Kingdom . |
| 856546 | 12/1960 | United Kingdom . |
| 990177 | 4/1965 | United Kingdom . |
| 995614 | 6/1965 | United Kingdom . |
| 1058710 | 3/1966 | United Kingdom . |
| 1307011 | 2/1967 | United Kingdom . |
| 2091983 | 8/1982 | United Kingdom . |

Primary Examiner—Andres Kashnikow
Assistant Examiner—Kevin Patrick Weldon
Attorney, Agent, or Firm—Penrose Lucas Albright

[57] ABSTRACT

An agricultural spreader comprises distribution members (11, 12) which rotate to eject material such as fertilizer. The spreader can tilt to one side or the other so as to reduce the spreading distance on one side. This facility enables the spreader to be driven on a field along the same tracks as other agricultural machinery while avoiding waste of material at the edges of fields. Other embodiments utilize braking members which are movable into the path of ejected material to reduce its kinetic energy and consequently its spreading distance.

17 Claims, 10 Drawing Sheets

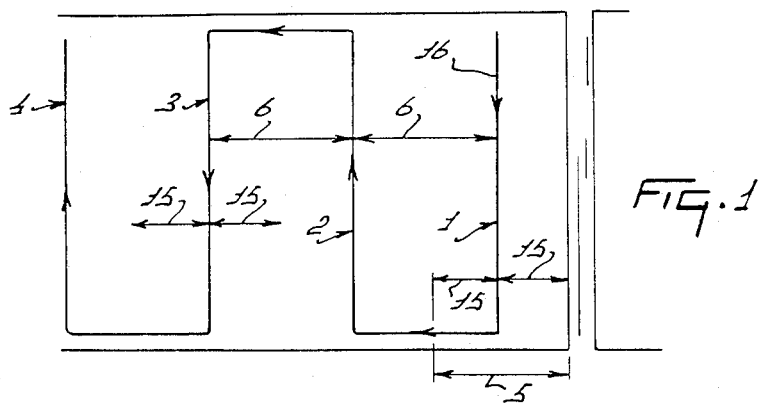
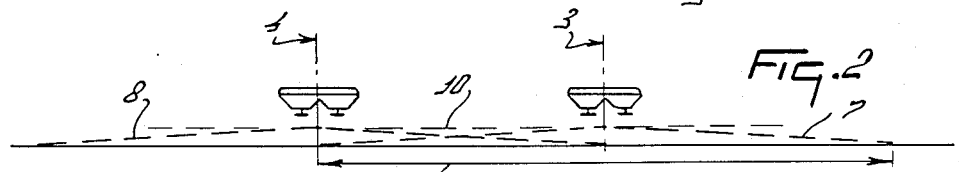
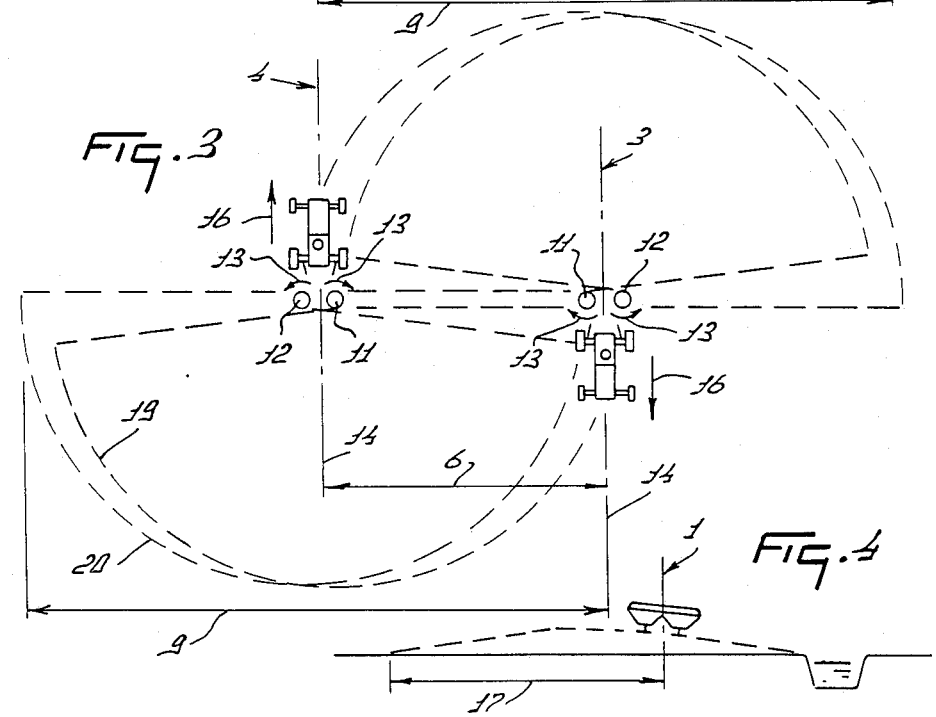
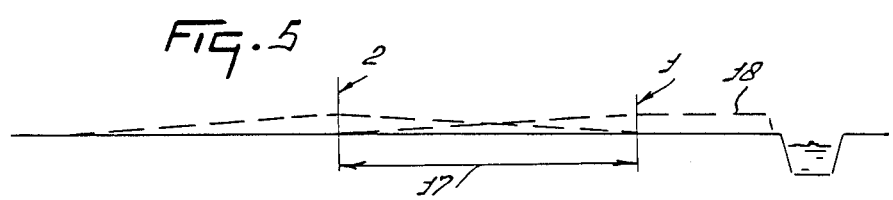

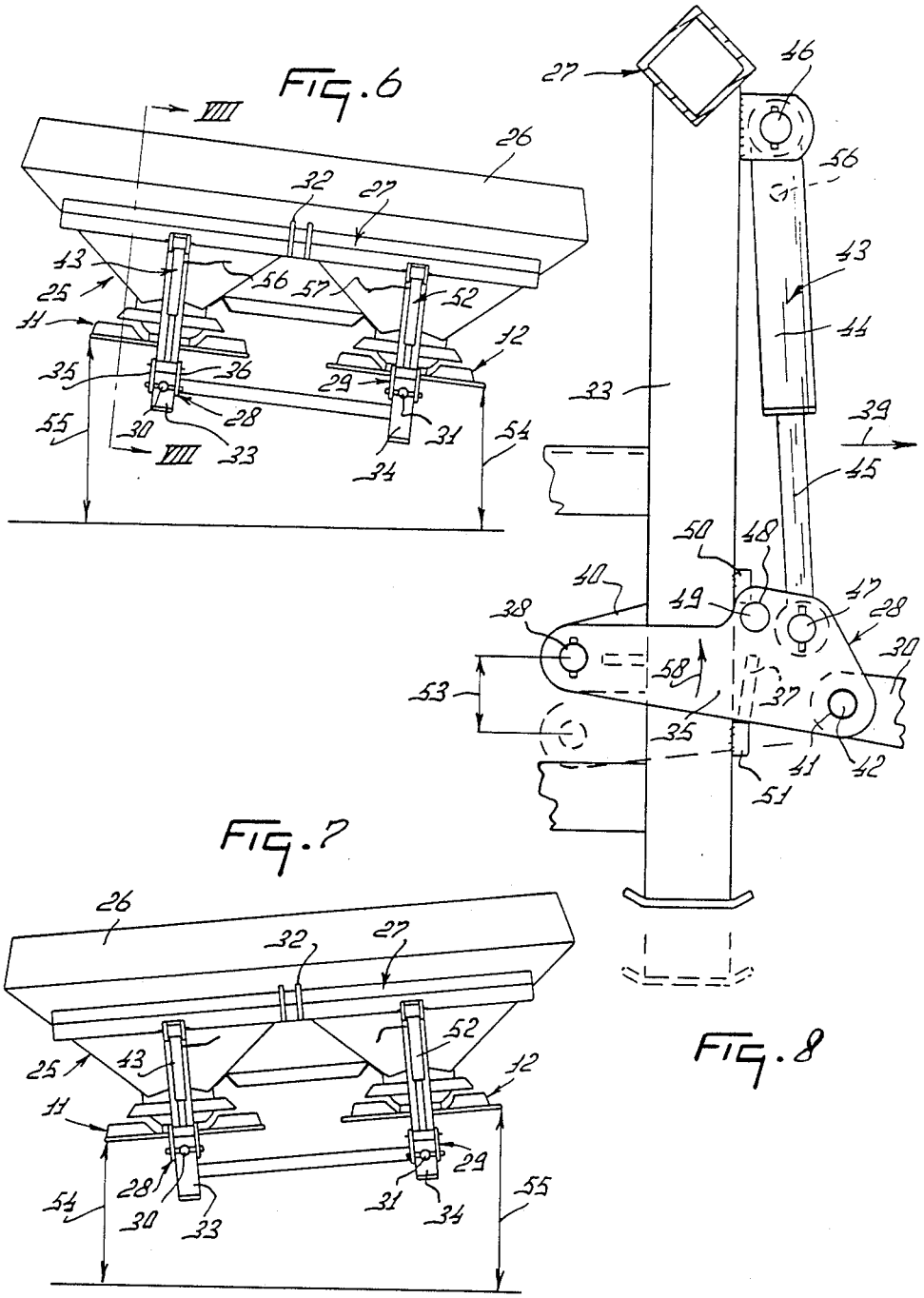

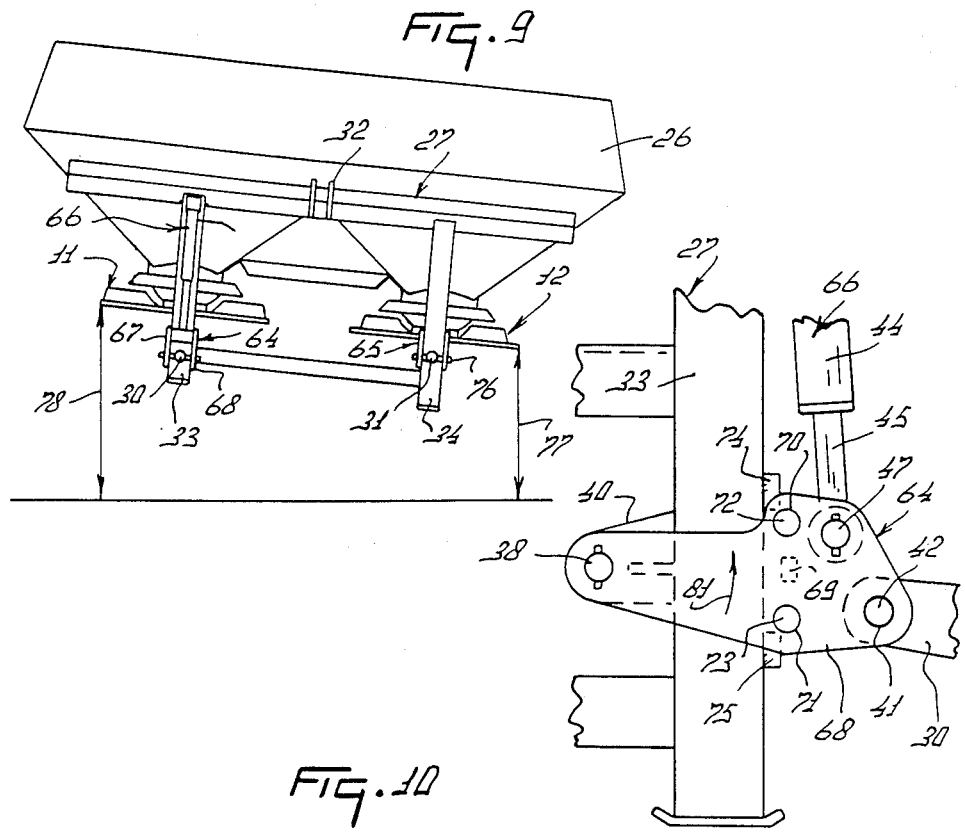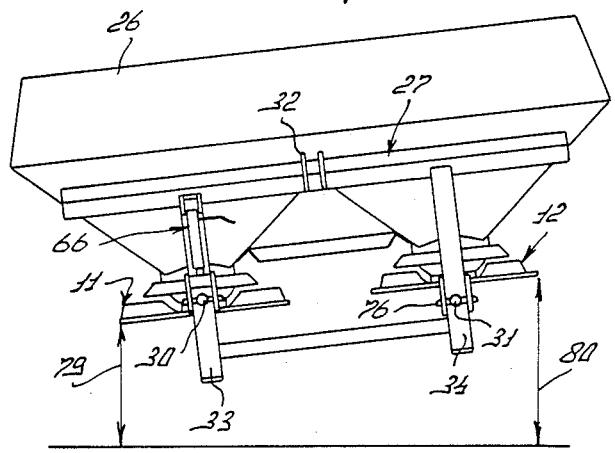

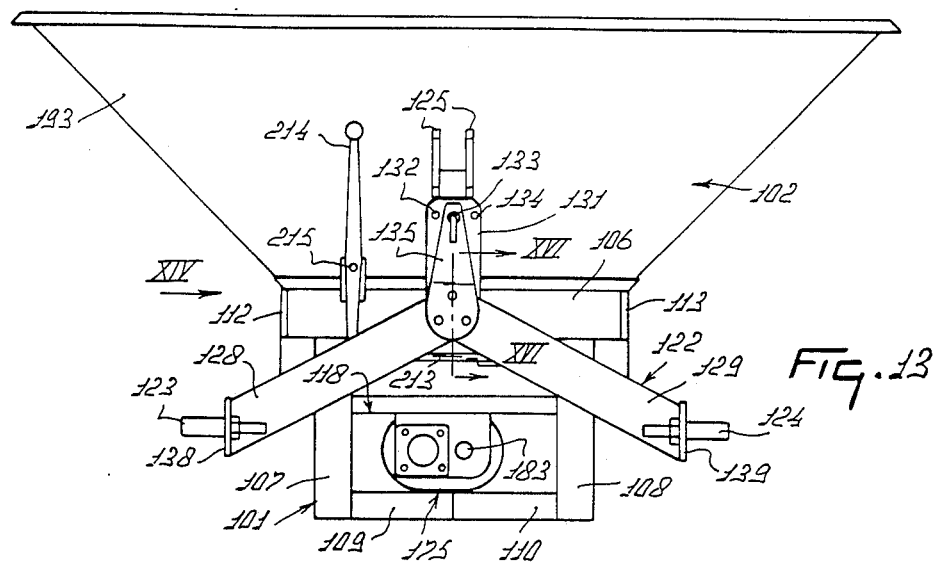

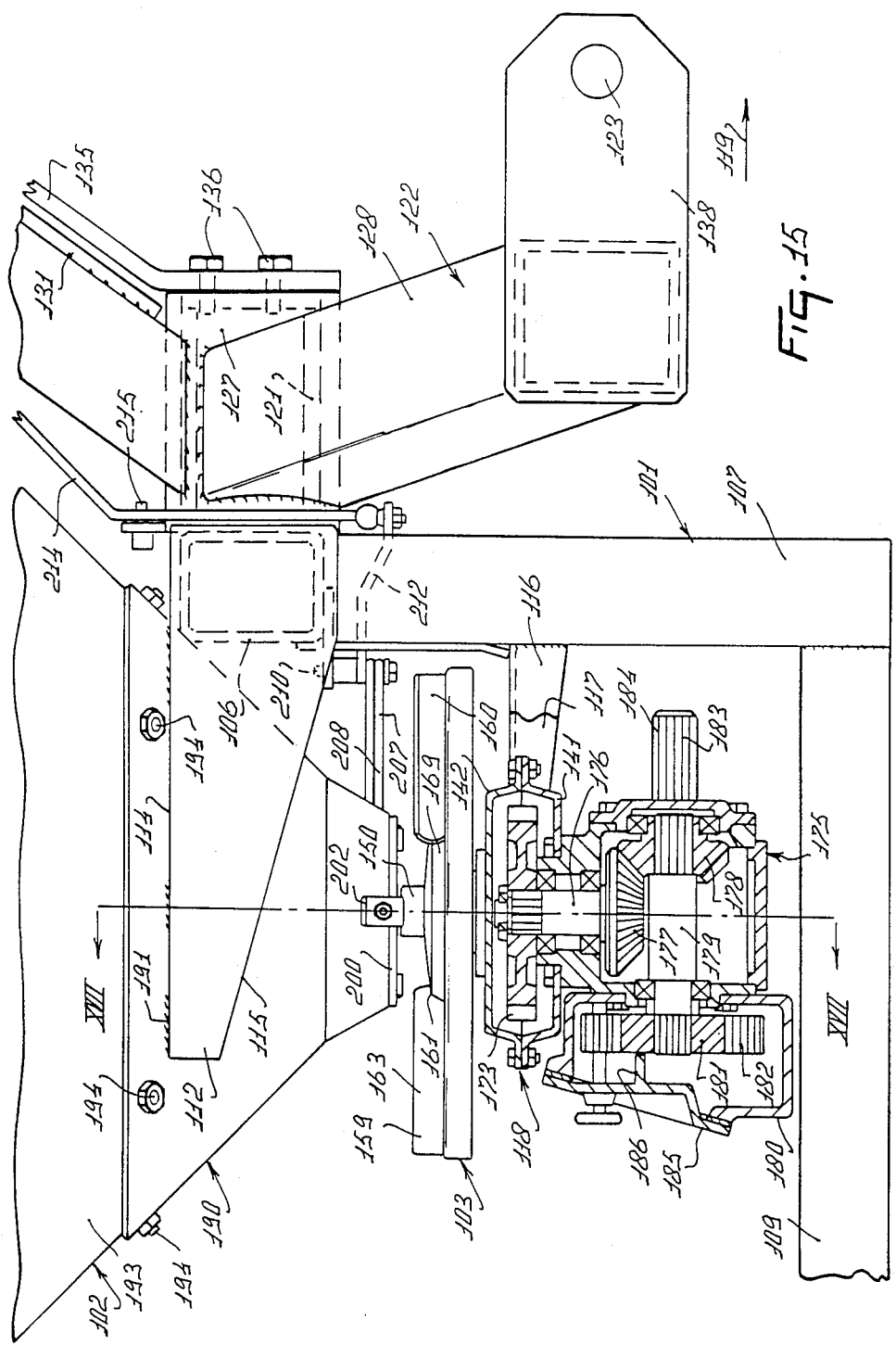

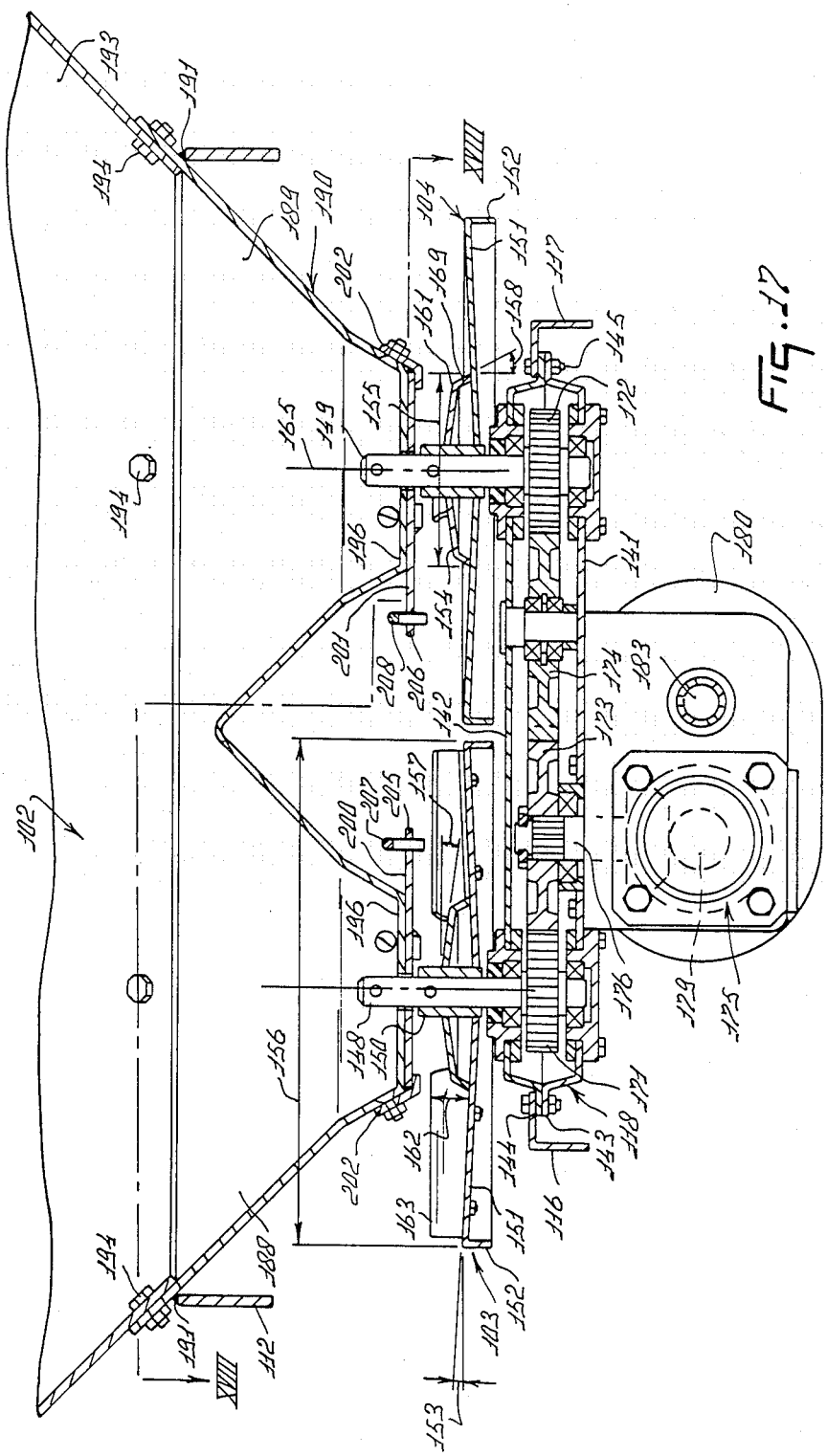

SPREADING MATERIAL ON A SURFACE

TECHNICAL FIELD

This invention relates to the spreading of material on a surface, and particularly, although not exclusively, to a spreader for spreading fertilizers, in granular or powdery form, over agricultural land.

BACKGROUND ART

Spreaders are known which comprise a frame and a spreading member which is movable about an axis to eject material to be spread, the spreader having fastening means for mounting the spreader on a carrier. For example, DE-AS No. 1,180,562 discloses a spreader which can be coupled with the three-point lifting device of a tractor. The spreader can be set in an inclined position relative to the normal direction of operative travel by displacing one of the two lower lifting arms of the three-point lifting device of the tractor with respect to the other lifting arm. However the adjustment of the spreader into the inclined position can be carried out only with difficulty, and requires troublesome measurement. Returning the spreader to the normal level position is also a troublesome job, and can be accomplished only with difficulty. DE-AS No. 1,180,562 also discloses a spreader which can be mounted on an intermediate frame in order to set the spreader in an inclined position. With this construction the spreader can be displaced between the inclined position and the level position only with difficulty. With the known spreaders, the inclined position is used so that the material is spread on each side of the device over equal distances.

SUMMARY OF THE INVENTION

According to the present invention, the spreader is adapted to assume selectively an operative condition in which, on one side of the spreader, the material is spread uniformly over a reduced spreading width.

Embodiments in accordance with the present invention provide spreaders which can be readily set in a given tilted position from the normal working position in order to spread the material on one side over a smaller distance than in the normal, horizontal working position of the device. This can be achieved by making part of the fastening means displaceable upwardly and downwardly with respect to the frame. This part of the fastening means can then be arranged in at least two different positions so that by displacing the fastening means the spreader can be set in an inclined position and the spreading width to one side of the spreader can be limited. In this manner the material can be spread over a shorter distance, in particular, along the edges of fields to be covered. The inclined or tilted position can thus be used so that the material is spread uniformly and with desired flow rates at the edges of a field without the need for further adjustments of the spreader. Before now, the so-called lateral spread has required closing of one or more outlet ports with respect to the rotary axis of the distribution member to obtain the required direction of spreading. With the known-device and methods it is difficult to obtain the desired, uniform distribution pattern over a restricted width. These problems are overcome in spreaders in accordance with the present invention.

An advantageous embodiment of a spreader in accordance with the invention is obtained if the fastening means comprises a carrying arm which is pivotable with respect to the frame about a substantially horizontal pivotal axis. In another embodiment, the fastening means comprises a plate rigidly secured to the frame and having a slot in which a coupling element for coupling the spreader to a tractor is movable with respect to the frame and can be set in either of at least two different positions in the slot. Thus, the fastening means has few movable parts and can be easily manufactured.

In a further embodiment of a spreader in accordance with the present invention, the fastening means comprises an adjusting mechanism for displacing at least part of the fastening means upwardly and downwardly with respect to the frame. Tilting the spreader can thus be readily carried out.

In another embodiment in accordance with the present invention the frame is provided with at least two coupling points by which the spreader can be attached to a carrier such as a tractor, the two coupling points being displaceable together with respect to the distribution member. In this way the position of the distribution member with respect to the surface to be covered can be changed easily for controlling the distribution of the material on the surface to be covered.

An advantageous embodiment is obtained if the coupling points are on a coupling frame which is rotatable with respect to the main frame about a horizontal pivotal axis extending in the normal direction of operative travel of the spreader. This permits, in particular, effectively setting the distribution of the material on one side of a field.

The spreader may have a hopper of which an upper part is arranged by clamping means such as bolts on a lower part of the hopper having, for example, an outlet spout which is rigidly secured to the frame. The part of the hopper having outlet ports is preferably fixed with respect to the distribution member. In this way a uniform spread of the material, even after frequent use of the spreader, is maintained since the outlet ports maintain their positions relative to the distribution member.

The distribution of the material is effectively improved when the underside of the hopper is provided with a dosing member and a feeding member is provided between the dosing member and the distribution member. The top side of the feeding member is located approximately half way up the height of ejection blades of the distribution member. In this way a satisfactory supply of material to the ejection blades of the distribution member is ensured so that the uniform distribution of the material is improved.

In other embodiments of the present invention, there is provided adjacent to at least part of the periphery of the distribution member, where the material is ejected during the operation of the spreader, a braking member for reducing the speed of the material ejected by the distribution member so that at least some of the ejected material is spread over a shorter distance from the distribution member than it would be without the braking member. In this way the spreader can be used to cover the edges of a field without the need for further adjustments of the spreader other than moving the braking member into the spreading path of the material. The braking member reduces the speed of the material to an extent such that it is spread over the desired lateral distance from the device, which is smaller than the normal distance over which the material is laterally spread.

The present invention also provides a method of spreading material such as fertilizer, by means of a spreader comprising a distribution member which is movable about an upwardly extending rotary axis, in which the spreading width on one side of the spreader can be limited by tilting at least the distribution member in a direction transverse of the direction of operative travel of the spreader.

BRIEF DESCRIPTION OF THE DRAWINGS

For a better understanding of the present invention and to show how it may be carried into effect, reference will now be made, by way of example, to the accompanying drawings, in which:

FIG. 1 illustrates diagrammatically the working path of an agricultural machine across a field;

FIG. 2 illustrates diagrammatically distribution patterns of a spreader on adjoining runs;

FIG. 3 is a schematic plan view corresponding to FIG. 2;

FIG. 4 is a schematic rear view of a tilted spreader;

FIG. 5 shows diagrammatically a distribution pattern obtained using a spreader which is tilted as illustrated in FIG. 4;

FIG. 6 is an enlarged front view of a spreader which is tilted as illustrated in FIG. 4;

FIG. 7 corresponds to FIG. 6 but shows the spreader tilted in the opposite direction;

FIG. 8 is an enlarged sectional view taken on line VIII—VIII in FIG. 6;

FIG. 9 is a front view of another embodiment of a spreader which is tilted;

FIG. 10 corresponds to FIG. 9 but shows the spreader tilted in the opposite direction;

FIG. 11 is an enlarged sectional view taken on the line XI—XI in FIG. 9;

FIG. 13 is a front view of another embodiment of a spreader;

FIG. 14 is a side view of the spreader of FIG. 13 taken in the direction of the arrow XIV in FIG. 13;

FIG. 15 is an enlarged sectional view of part of the spreader of FIGS. 13 and 14;

FIG. 16 is an enlarged sectional view taken on the line XVI—XVI in FIG. 13;

FIG. 17 is a partly sectional view taken on the line XVII—XVII in FIG. 15;

DESCRIPTION OF PREFERRED EMBODIMENTS

Figure 18:
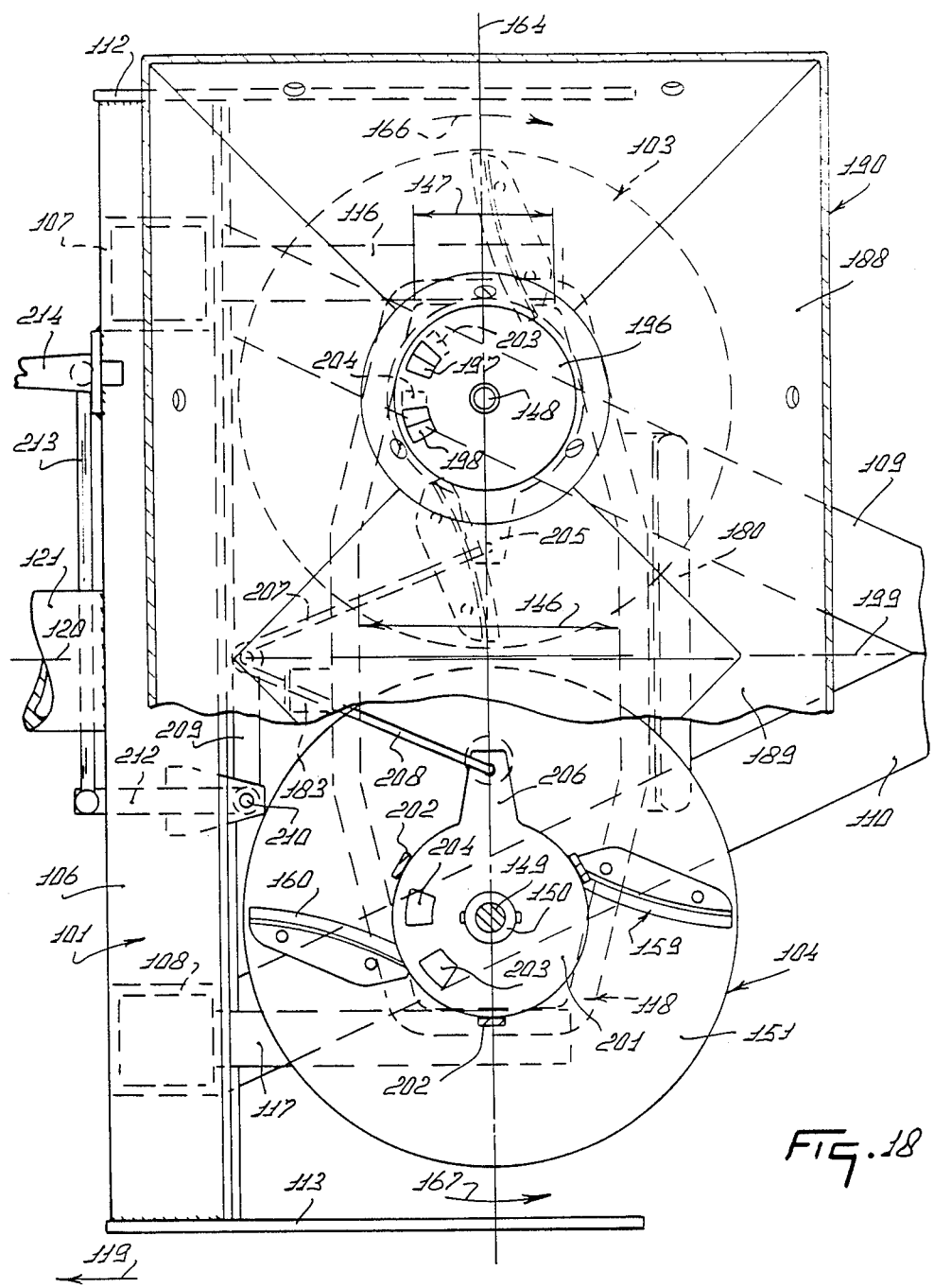
FIG. 18 is a view taken on the line XVIII—XVIII in FIG. 17.

In carrying out the various operations required on a field under cultivation, it is preferred to drive the implements always over the same tracks. The locations of the tracks are usually determined by the passage of dispensing equipment, such as sprayers, which have to be driven several times in each growing season across the field for spreading or distributing materials, for example, for weed and pest control. Therefore adjacent runs are preferably carried out by driving along the successive rows of tracks 1, 2, 3 and 4 shown schematically in FIG. 1. The distance between these tracks is specifically determined by the effective width of the spreaders. Typically, current spreaders cover a width 15 on each side of the spreader of about twelve meters so that the overall working width 5 is twenty-four meters. The tracks along which the machines travel are spaced apart by a distance 6, which is equal to the overall working width 5 of a spreader. Half of the distance 6 is covered by the machine running along one track, for example, the track 3 and the other half by the machine running along the adjacent return run (for example, track 4).

Spreading devices for distributing, in particular, fertilizer are preferably also driven along the tracks 1, 2, 3 and 4. The spreading widths of the spreading devices are selected so that during travel along the tracks the surface to be covered is provided in the desired manner with the correct amount of material per unit surface. FIG. 2 schematically illustrates distribution patterns 7 and 8 obtained by a spreader advancing along the track 3 and returning along the track 4. The distribution patterns 7 and 8 cover an overall width 9 equal to twice the width 6 between two adjacent tracks. The spreaders are preferably constructed so that distribution patterns 7 and 8 of the kind shown in FIG. 2 are achieved. When spreading during travel along the adjacent tracks 3 and 4, the distribution patterns obtained will overlap one another as is shown in FIG. 2 between the tracks 3 and 4. The overall common distribution pattern indicated by the line 10 is then obtained so that the material is uniformly distributed on the surface to be covered. A distribution pattern corresponding with the patterns 7 and 8 shown can be obtained in an advantageous manner by a spreader provided with two spreading members 11 and 12 rotating in opposite direction as indicated by the arrows 13. The machines are constructed so that each of the spreading members 11 and 12 spreads the material over the whole width 9. Owing to the opposite directions of rotation 13 of the two spreading members, the spreading members 11 and 12 spread the material symmetrically about a plane 14 which is at right angles to the surface to be covered and goes through the longitudinal center line of the spreader centrally between the two spreading members 11 and 12 (FIG. 3).

The overall width 9 of a distribution pattern is twice the width 6 between each run of the spreader. When the spreader is running along the first track 1 which is a distance 15 (half the width 6) from the edge 21 of the field, the material would be spread far beyond the edge 21 of the field. This would involve undesirable losses of material, while the strip 15 between the track 1 and the edge 21, in particular towards the edge 21, would receive too little material. This is illustrated in FIGS. 1 and 2.

The present invention provides a simple method of covering the width 15 in the correct manner with the desired amount of material. The spreader is tilted into an inclined position in a manner such that, when running along the track 1 in the direction of the arrow 16, the spreading members slope downwards towards fhe left-hand side of the machine as is schematically shown in FIG. 4. The degree of tilt is chosen so that the distance over which the material is spread is equal to half the spreading width 9. It has been found that this tilting enables the material to be spread over the width 15 of a distribution pattern 18 schematically shown in FIG. 5, without any change of the supply of material from the hopper of the spreader to the spreading members. It has furthermore been found that, on the side towards which the spreading members slope upwardly, the spreading width is substantially unaffected and the material will be spread, as shown in FIG. 5, on the right-hand side of the track 1 over a distance 17 which is substantially equal to half of the overall normal spreading width 9. In this manner, as is shown in FIG. 5, a distribution pattern is obtained on the right-hand side of the device corresponding to the normal spreading run in which the two spreading members are parallel to the surface to be covered. As a result, when running along the track 2 the distance 17 can overlap the distribution pattern in the same manner as shown between the tracks 3 and 4 in FIG. 2. Thus an overall distribution pattern corresponding with the desired, uniform overall distribution pattern 10 shown in FIG. 2 is obtained between the tracks and between the edge 21 and the track 1.

It is a particularly advantageous feature of this method that, when spreading the material towards the edge 21, there is no need to adjust the outlet ports through which the desired flow of material is controlled from the hopper to the spreading members. Also, there is no necessity to adjust, for example, the spreading direction. After travel along the track 1 in the direction 16, work can be resumed normally on the further tracks, such as tracks 2, 3 and 4 by returning the spreader to the horizontal position. The tilting of the spreader can be readily carried out in the field without the risk of errors in adjustment, which has to be accurate in order to spread the desired amount of material uniformly on the surface to be covered.

When performing a run in which the material has to be spread over a short distance to the right-hand side of the spreader, for example when the spreader is driven along the track 1 in a direction opposite the arrow 16, it can be tilted to the other side.

Typical dispensing equipment covers a width of twenty-four meters, that is to say, twelve meters on each side. Therefore the tracks 1, 2, 3 and 4 are usually spaced apart by a distance 6 of twenty-four meters, while the distance 15 is usually twelve meters. Consequently, it is preferable for the spreaders to cover an overall working width 9 of forty-eight meters, while in view of the overlap shown in FIG. 2 the effective spreading width is twenty-four meters. The spreading width 15 on one side of the inclined device then amounts to twelve meters. In order to obtain this spreading width of twelve meters on one side the spreader is usually tilted at an angle of about 6° to 7° with respect to the surface to be covered. This angle may be smaller or larger by a few degrees, depending on the machine. In particular, by constructing the spreader in the manner shown in FIG. 3, a spreading width 9 can be obtained with a uniform distribution in accordance with the distribution patterns of FIG. 2. As is shown in FIG. 3 the spreading member 11 spreads the material over a sector 19 and the spreading member 12 spreads it on a sector 20. These sectors are symmetrical about the plane 14.

FIGS. 6, 7 and 8 show a spreader 25. The spreader has a hopper 26 below which are arranged spreading members 11 and 12, which are rotatable about upwardly extending rotary axes in opposite senses as indicated by the arrow 13 in FIG. 3. The hopper 26 has outlet ports (not shown in detail) through which material to be spread can be fed from the hopper to the spreading members. The ports can be closed to a greater or lesser extent to control the flow rate of material from the hopper. Thus also the amount of material to be spread per unit area can be controlled. The spreader 25 comprises a frame 27 provided with fastening members 28 and 29 by which the spreader can be coupled with lower lifting arms 30 and 31 of the three-point lifting device of a tractor. The frame 27 also comprises a fastening member 32, which can be coupled with the top rod of the lifting device of the tractor. The frame 27 has vertical frame members or posts 33 and 34, on which the fastening members 28 and 29 are adjustably mounted to enable the spreader to tilt in the manner described above. The way in which the fastening members 28 and 29 are constructed and mounted is identical for both of them and will therefore be described in detail only for the fastening member 28.

The fastening member 28 comprises two plates 35 and 36 which lie on opposite sides of the post 33 and constitute carrying arms coupled with one another by a plate 37. The fastening member 28 is pivotable about a pivotal shaft 38 with respect to the post 33. The pivotal shaft 38 is to the rear of the post 33, with respect to the normal direction of travel 39 of the spreader 25, and is horizontal when the machine is level. The pivotal shaft 38 is arranged on lugs 40 fastened to the rear of the post 33. The plates 35 and 36 have aligned holes 41 through which extends a coupling pin 42 associated with the fastening member to connect the spreader to the lower lifting arm 30. The fastening member 28 is provided with an adjusting mechanism 43 in the form of a hydraulic lifting mechanism having a cylinder 44 and a piston rod 45. The cylinder 44 is pivotally mounted on a pivotal shaft 46 which is rigidly secured to the post 33, and the piston rod 45 is pivotally connected to the member 28 by a pivotal shaft 47. The fastening member 28 also has aligned holes 48 in the plates 35 and 36, into which a locking pin 49 can be inserted. The post 33 is provided with an upper stop 50 and a lower stop 51. The fastening member 29 is identical to the member 28 and it is provided with a lifting mechanism 52 corresponding with the lifting mechanism 43.

When the spreader shown in FIGS. 6 to 8 is used for carrying out the method described with reference to FIGS. 1 to 5, the lifting mechanisms 43 and 52 are unloaded to maintain the level position of the spreader. The two spreading members 11 and 12 are then horizontal or parallel to the surface to be covered. The lifting mechanisms 43 and 52 and the fastening members 28 and 29 then occupy a position relative to the frame 27 as shown on the left-hand side of FIG. 6 for the fastening member 28 and in FIG. 8 by solid lines for the member 28. When the fastening members 28 and 29 are coupled with the lifting arms 30 and 31 of a tractor and the spreader is lifted above the ground, the weight of the spreader and of any material in the hopper will tend to turn the fastening members about the pivotal shaft 38 in the direction of the arrow 58. This turn can be prevented by placing the pin 49 in the holes 48. This pin then bears on the stop 50. Thus the fastening members are prevented from rotating in the direction 58 with respect to the frame. Thus the spreader can be held in a horizontal position. In this position the plate 37 is in contact with the stop 51 so that a movement of the fastening members 28 and 29 about the pivotal shafts 38 is entirely prevented.

To tilt the spreader into a position as shown in FIGS. 4 and 6 so that it slopes downwards towards the left, with respect to the direction of movement 39, the lifting mechanism 52 is hydraulically actuated so that there is a tendency to extend the rod 45 from the cylinder 44. Thus the force by which the pin 49 bears on the stop by the weight of the spreader will be relieved by the lifting mechanism 52 so that the pin 49 can be removed from the holes 48. The plate 37 is then pressed against the stop 51 so that movement of the fastening member 29 about the shaft 38 is prevented. The pressure in the cylinder 44 is then relieved so that the weight of the spreader causes the fastening member 29 to turn about the pivotal shaft 38 with respect to the frame 27 into the position indicated by broken lines in FIG. 8. When the plate 37 comes into contact with the stop 50, further turning of the fastening member 29 about its pivotal shaft 38 is prevented. The shaft 38 then has sunk down with respect to the pin 42 and the lifting arm 30. Then also the left-hand side of the device has sunk down so that the device occupies an inclined position. The distance 53 over which the shaft 38 sinks down can be selected by means of the dimensions of the structural parts. The distance 53 is thus sufficient so that the spreader is tilted in the desired manner to spread the material towards the left-hand side over the desired distance 15. To move the spreader out of the tilted position shown in FIG. 6 into a horizontal position, fluid is again introduced under pressure into the cylinder 44. The fastening member 29 is then again turned about the shaft 38 into the position indicated by solid lines for the member 28. The plate 37 comes into contact with the stop 51, after which the pin 49 can again be inserted into the holes 48. Then the fastening member is again locked in place, after which the pressure can be removed from the cylinder 44.

FIG. 7 shows a situation corresponding to FIG. 6, in which the spreader is tilted to the right. This position can be obtained by actuating the mechanism 43 rather than the mechanism 52 so that the right-hand side of the device is lowered by turning of the fastening member 28 about its shaft 38 over a distance 53 with respect to the fastening member 29 as stated above. From this tilted position the spreader can again be rapidly to a horizontal position in the same manner as described above with reference to FIG. 6.

By lowering the machine on one side so that it tilts, the distance from the ground 55 of the spreading member on the other side is substantially maintained. The distances of the spreading members 11 and 12 from the ground are determined by the construction of the device. When tilting the device in the manner shown in FIGS. 6 and 7, the distance 54 between the circumference of the spreading member nearest the ground and the ground will be smaller than the distance of the spreading members above the ground in the normal horizontal position of the spreader. Regardless of the side to which the spreader is tilted, the distances 54 and 55 will remain the same. Tilting the machine and return to the horizontal position can be carried out simply by supplying fluid to the cylinder 44 of the lifting mechanism 43 or 52. For this purpose the cylinders 44 are connected with a hydraulic circuit of, for example, a tractor to which the spreader is attached, which is not shown in detail. By means of the stops 50 and 51 and the plate 37 the positions of the fastening members can be readily set. Apart from tilting, no further adjustments of the device are required. The set values of, for example, the outlet ports between the hopper and the spreading members need not be adjusted, nor the spreading directions of the material by altering the ports around the rotary axes of the spreading members. In this way, as stated above, the adjustment required for spreading the material on the peripheral area 15 of the field in the desired amount can be readily achieved, and after having covered this area the normal setting can rapidly be resumed.

FIGS. 9, 10 and 11 show an embodiment in which a lifting mechanism 66 is provided on only one side of the spreader. The side with the lifting mechanism is either lifted or lowered for tilting the spreader from the normal working position in which the two spreading members are horizontal. The frame is provided on one side with a fastening member 64, which is adjustable with respect to the frame. On the other side a fastening member 65 is rigidly secured to the frame and comprises two plates 67 secured one on each side of the post 33. Parts of the spreader shown in FIGS. 9 to 11 corresponding with those of the device shown in FIGS. 6 to 8 are designated by the same reference numerals. The fastening member 64 is connected with a lifting mechanism 66 identical to the lifting mechanism 43. The fastening member 64 comprises two plates 68 disposed one on each side of the post 33 and interconnected by a tie bar 69. The fastening member 64, like the fastening member 28 of the preceding embodiment, is pivotable about a pivotal shaft 38 with respect to the frame 27. Above the tie bar 69, the fastening member 64 has aligned holes 70 in the plates 68. Below the tie bar 69 the plates 68 have aligned holes 71. The holes 70 and 71 are spaced apart by equal distances from the tie bar 69. Locking pins 72 and 73 can be inserted into the respective holes 70 and 71. The post 33 is provided with an upper stop 74 and a lower stop 75.

In the position shown in FIG. 11 the fastening member 64 is oriented with respect to the frame so that the pin 42 is in line with the pin 76 which connects the arm 31 to the fastening member 65. The position of the fastening member 64 with respect to the frame 27 shown in FIG. 11 serves to hold the spreader level, the spreading members then being horizontal or parallel to the surface to be covered. In this position the fastening member 64 is prevented from turning about the pivotal shaft 38 by the locking pins 72 and 73 in the holes 70 and 71. The pins 72 and 73 contact the stops 74 and 75 respectively to support the frame 27 with respect to the pin 42 and the arm 30. If pin 73 is taken out of the holes 71 and the mechanism 66 is actuated so that the piston rod 45 is extended out of the cylinder 44 so that the pivotal shaft 47 is pressed downwards with respect to the frame 27, fastening member 64 turns in a relative sense about the pivotal shaft 38 in a direction opposite that indicated by the arrow 81. This turn can be continued until the tie bar 69 comes into contact with the stop 75. In this position the piston rod 45 can be locked with respect to the cylinder 44, for example, by closing a valve in the feed duct to the cylinder 44. The pressure of the fluid in the cylinder can thus be maintained. By lifting the frame near the fastening member 64, the spreader is tilted as shown in FIG. 9. The distance 77 of the outermost part of the ejection member 12 will not change much with respect to the position in which the spreading members are horizontal. The distance 78 between the spreading member 11 and the ground is then larger than in the normal horizontal working position of the spreader. The stroke of the fastening member 64 with respect to the frame 27 is selected so that the spreader will slope down to the left-hand side so that the material can be spread to the left over a width 15 equal to half the distance over which the material is spread to that side when the spreader is level. As in the preceding embodiment, the material is uniformly distributed over the area 15 to be covered, the tilting resulting in a distribution pattern 18 of the kind shown in FIG. 5.

From the medium position in which the spreading members 11 and 12 are horizontal, the spreader can sink down on the side of the lifting mechanism 66, the fastening member 64 turning in the direction of arrow 81 relative to pivotal shaft 38. To do this, the locking pin 72 is removed by lifting mechanism 66 first being subjected to pressure thereby taking the weight of the spreader and moving the pin 72 out of contact with the stop 74. Under the action of its weight, the spreader can then sink down on the side of the fastening member 64, the fastening member 64 turning about the shaft 38. The frame 27 can sink down until the tie bar 69 comes into contact with the stop 74 which then prevents further turning of the fastening member 64 relative to pivotal shaft 38 in the direction of arrow 81. In this position the fastening member is maintained in position with respect to the frame by the weight of the spreader and of any material in the hopper.

Since, when tilting, the spreader turns about the connection of the arm 31 with the fastening member 65, the part of the spreading member 11 farthest from the center reaches a position at a distance 79 above the ground which is smaller than the distance of the spreading member 11 above the ground in a horizontal position of the device. The distance 80 will then differ little from the distance 77. If in tilting the spreader the distance of the spreading members above the ground for spreading specific kinds of material does not have the desired value to obtain the desired distribution pattern, this distance can be corrected by moving the lifting arms 30 and 31 slightly upwards or downwards.

In the embodiment of FIGS. 9 to 11, only one lifting mechanism 66 is required so that the spreader can be slightly simpler in construction. However, in tilting to one side the height of the spreading member 11 above the ground measured between the highest and the lowest positions will be slightly larger than in the embodiment of FIGS. 6 to 8. The construction shown in FIGS. 9 to 11 enables a side area 15 of the surface to be covered to be readily provided with the desired amount of material per unit area with uniform distribution. This construction does not require further adjustments of the device, for example by closing the outlet ports to a greater or lesser extent or on one side or by changing the spreading direction. Thus the construction of FIGS. 9 to 11 also permits of working very rapidly in carrying out the method described with reference to FIGS. 1 to 5.

Figure 12:
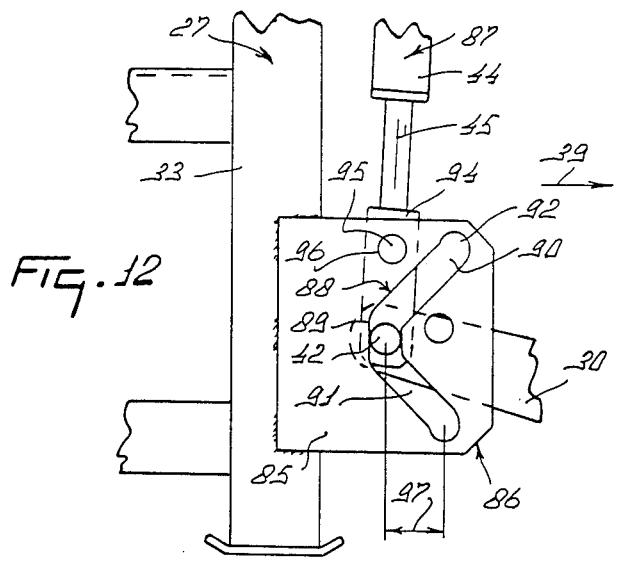
FIG. 12 corresponds to FIG. 11 but shows another embodiment.

FIG. 12 shows a further embodiment of a fastening member by means of which the spreader can be raised or lowered on one side from a medium position, as in the embodiment of FIGS. 9 to 11. In the embodiment of FIG. 12 the fastening member 86 comprises two plates 85 which are rigidly secured one to each side of the post 33. The lifting arm 30 is disposed between the plates 85 and is connected with the fastening member 86 by a pin 42. For this purpose the fastening member 86 has a slot 88 into which the pin 42 extends. The pin 42 also extends through an opening in the arm 30 and through an opening in a coupling member 94 fastened to the lower end of the piston rod 45 of a lifting mechanism 87 which corresponds to the lifting mechanism 66. The pin 42 is retained axially in position. The slot 88 has a central part 89 and upper and lower parts 90 and 91. At the ends of the parts 90 and 91 there are recesses 92 and 93 respectively. The central part 89 is parallel to the post 33. From the central part 89 the parts 90 and 91 slope to the front with respect to the normal direction of movement 39 of the spreader, the part 90 sloping upwardly and the part 91 sloping downwardly from the central part 89.

In use of the construction of FIG. 12, the spreader is maintained level by maintaining the pin 42 in the central part 89 of the slot 88. In this position the location of the pin 42 in the slot 88 and hence that of the lower arm 31 with respect to the fastening member 86 can be fixed by inserting a locking pin 95 into holes 96 in the plates 85 and into a hole in the coupling part 94. The spreader can be tilted by removing the pin 95 so that the frame sinks down under the weight of the device and of any material in the hopper. This causes the pin 42 to move along the part 90 of the slot 88 towards the recess 92. When the pin 42 reaches the recess 92, the spreader cannot sink any farther. When the fastening member 80 is fitted on the right-hand side of the spreader, the spreader will slope downwards to the right as is shown in FIG. 11. The material can then be uniformly spread to the right over the narrow strip 15. The spreader can be tilted to the other side by lifting it, with the aid of the lifting mechanism 87, with respect to the pin 42 and the arm 30. By actuating the lifting mechanism 87 the pin 42 can be pushed downwards with respect to the frame 27 so that the pin 42 moves along the part 91 of the slot 88. When the pin 42 reaches the recess 93, the side of the spreader on which the member 86 is fitted is lifted. The spreader then slopes to the other side to spread the material to the desired side over the shorter distance 15.

The parts 90 and 91 of the slot 88 slope so that, when the spreader is tilted out of the medium position, the spreader will move slightly to the rear with respect to the pin 42. The magnitude of this rearward movement depends on the horizontal distance 97 between the central part 89 and the recesses 92 and 93 respectively. In the medium position of the device the recesses 92 and 93 are located one above the other. By slightly moving the spreader, at its connection with the arm 30, away from the tractor, the spreader, as well as being tilted, will also be slightly inclined upwards and to the rear transversely of the normal direction of movement 39. Thus the ejection discs are also slightly inclined upwards to the rear. The material is then spread in an inclined direction by the tilting as well as in a slightly inclined direction upwards and to the rear. This rearwardly and upwardly inclined position of the ejection discs can futher influence the distribution of the material on the surface to be covered. In particular, for spreading specific kinds of material the distribution pattern obtained over the shorter distance 15 on the side of the spreader can be corrected to obtain a sufficiently uniform distribution over the distance 15 at the side of the spreader. When spreading some kinds of material it may happen that tilting only results in a distribution pattern which is not fully uniform towards the edge 21. This can be corrected by also tilting the spreader slightly in the direction of movement. With the construction shown in FIG. 12 this correction is performed automatically. The construction for enabling this automatic correction by tilting in the direction of movement may, as an alternative, be arranged on the two vertical posts 33. Then the construction shown in FIG. 12 can be arranged on the two posts 33, in which case the slot 88 need only have the inclined parts 90 or 91.

Although in the preceding embodiments substantially the whole spreader is tilted transversely of the direction of movement, the spreader may, as an alternative, be constructed so that only the spreading member or members can be tilted as a unit with respect to a carrier, for example, the frame of the spreader.

The spreader shown in FIGS. 13 to 18 comprises a frame 101 which supports a hopper 102 and distribution members 103 and 104. The frame 101 comprises a main frame beam 106 which is horizontal when the spreader is level. On the underside of the frame beam 106 there are two frame beams 107 and 108 which extend downwards at right angles to the frame beam 106. At the lower ends of the frame beams 107 and 108 are fixed two ground beams 109 and 110, which converge rearwardly with respect to the normal intended direction of travel 119 of the spreader. The beams 109 and 110 meet one another and are interconnected by a tie piece 111. The frame beams 107 and 108 meet the frame beam 106 at short distances from its ends. The ends of the beam 106 are provided with hopper supports 112 and 113. The hopper supports 112 and 113 are in the form of upright plates. The top edges 114 of the supports 112 and 113 are horizontal and coplanar with the top face of the beam 106. The lower edges 115 of the supports 112 and 113 slope upwardly away from the lower edge of the beam 106. The hopper 102 is supported on the top edges 114. Approximately midway between the ground beams 109 and 110 and the hopper supports 112 and 113 the beams 107 and 108 are provided with carrying arms 116 and 117, which extend rearwardly from the beams 107 and 108. The carrying arms 116 and 117 support a gear box 118 which serves as a carrying member for the distribution members 103 and 104.

The frame beam 106 is provided with a tubular spigot 121, the centerline 120 of which constitutes a pivotal axis which preferably passes approximately through the center of gravity of the spreader. The spigot 121 projects forwardly from the beam 106 and carries a coupling frame 122. The coupling frame 122 has two coupling points in the form of coupling pins 123 and 124, by which the spreader can be attached to the lower lifting arms of the lifting device of a tractor or a similar vehicle. The coupling frame 122 has a further coupling point in the form of coupling plates 125 having holes 126 for connecting the spreader to the top arm of the three-point lifting device. The coupling frame 122 comprises a pivotal sleeve 127, which is rotatable about the spigot 121.

To the sleeve 127 are fastened coupling arms 128 and 129 formed as rectangular cross-section hollow beams to the ends of which the coupling pins 123 and 124 are connected by connecting lugs 138 and 139. The sleeve 127 is also provided with a rectangular cross-section hollow coupling arm 130 to which the coupling plates 125 are fastened. The coupling arm 130 is provided with a fixing plate 131 having holes 132, 133 and 134 for receiving locking pins.

A locking arm 135 is fastened by bolts 136 to the spigot 121 so as to extend over the fixing plate 131. The locking arm 135 is provided with a locking pin 137. The locking pin 137 is spring loaded in a manner not shown so that the pin 137 is urged towards the fixing plate 131 and can be inserted optionally into any one of the holes 132, 133 or 134 by spring force.

The gearbox 118 comprises a lower casing part 141 and an upper casing part 142. The casing parts 141 and 142 are substantially identical and meet at a horizontal plane (when the spreader is level), to form a flat elongate gear casing. The lower and upper casing parts 141 and 142 are pressed from sheet steel and are provided with flanges 143 and 144 which are interconnected by bolts 145. The gearbox 118 has, in the middle, a width 146 and, at its ends, a width 147, which is about half the width 146. At its ends (width 147) the gearbox 118 is fixed by the bolts 145 to the carrying arms 116 and 117. The carrying arms 116 and 117 have an angular section as will be particularly apparent from FIG. 17.

Shafts 148 and 149, to which the distribution members 103 and 104 are fastened, are journalled in the gearbox 118. The distribution members 103 and 104 are identical in structure to each other in the sense of mirror images and corresponding parts are designated by the same reference numerals for the two distribution members. The distribution members 103 and 104 are each provided with a hub 150 by which they are fastened to the shafts 148 and 149 respectively. Each of the distribution members comprises a round plate 151, which is rigidly secured to the hub 150 and is provided at the outer circumference with a downwardly extending rim 152. The plate 151 is slightly conical, sloping upwards from the shaft 148 or 149, the top face of the plate 151 being inclined at an angle 153 of about 3° to a plane normal to the shaft 148 or 149. A different magnitude of the angle 53 may however, be selected.

In the middle the distribution members are provided with feeding members 154 in the form of a raised central part of the plate 151. The feeding members 154 each have a diameter 155 which is about equal to one third of the diameter 156 of the distribution member. The top face of the feeding member 154 slopes downwardly from the shaft at an angle 157 of about 7° to a plane normal to the shaft 148 or 149. The outer edge region 169 of the feeding member is at an angle 158 of about 30° to the vertical when the spreader is level, i.e. when the shaft 149 is also vertical. The magnitude of the angle 158 may also have a slightly different value. Each of the distribution members is provided with two ejection blades 159 and 160, which are diametrically opposite one another and are slightly curved as is shown in detail in FIG. 18. The ends of the ejection blades 159 and 160 are on a line 164 coinciding with the centerline 165 of the shaft 148, 149. The circumferential edge 161 of the underside of the surface at the angle 157 of each feeding member is located approximately midway the height 162 of the ejection blades, viewed near the circumferential part of the feeding members. The top edges 163 of the ejection blades 159 and 160 are parallel to a plane normal to the shafts 148 and 149. The corresponding parts of the two distribution members lie in a plane normal to the relatively parallel shafts 148 and 149. When the spreader is level, the two distribution members 103 and 104 are the same height as each other, the top edges 63 of the ejection blades of the two distribution members then lying in the same plane as each other. The ejection blades of the distribution rubber 103 are shaped symmetrically to the blades of the distribution member 104 so that the two distribution members face the same way with respect to the directions of rotation 166 and 167 thereof. The distribution members 103 and 104 are relatively arranged so that, as is shown in FIG.

18, when the line 164 going through the ends of the two ejection blades 159 and 160 of the distribution member 103 is at right angles to the normal direction of travel 119, the line 164 going through the ends of the ejection blades 159 and 160 of the distribution member 104 is parallel to the direction of movement 119.

The shafts 148 and 149 of the two distribution members are provided with spur gear wheels 171 and 172 respectively, which are accommodated in the gearbox 118. The gearbox 18 furthermore comprises two spur gear wheels 173 and 174, which are identical to each other and to the gear wheels 171 and 172. The gear wheels 171 to 174 lie in a common plane and are comparatively closely enclosed by the gearbox 118.

A cast iron gearbox 175 is secured to the underside of the gearbox 118 and a shaft 176 of the gear wheel 173 extends into the gearbox 175.

In the gearbox 175, the shaft 176 is provided with a bevel gear wheel 177, which meshes with a bevel gear wheel 178 disposed in the gearbox 175 and carried by a shaft 179. The shaft 179 is journalled in the gearbox 175 and extends to the rear with respect to the normal direction of travel 119 through the rear wall of the gearbox 175 and into the interior of a cast iron gearbox 180 associated with the gearbox 175. Inside the gearbox 180, the shaft 179 is provided with a spur gear wheel 181 in mesh with a gear wheel 182 on a shaft 183. The wheels 181 and 182 are exchangeable with each other and replaceable by other pairs of gear wheels. The shaft 183 extends from the gearbox to the front and projects from the front wall of the gearbox 175. Outside the gearbox 175, the shaft 183 has a coupling end 184 provided with splines by means of which the shaft 183 can be coupled with a driving shaft, for example, an auxiliary shaft to be driven by the power take-off shaft of a tractor to which the spreader is attached.

The distribution members 103 and 104 are disposed below delivery spouts 188 and 189 of the hopper 102. The delivery spouts 188 and 189 constitute at least part of a lower hopper part 190, which is rigidly secured to the frame. The hopper part 190 is welded to the hopper supports 112 and 113 by welds 191. The front of the hopper part 190 may be secured by welding to the frame beam 106 of the frame 101. The hopper 102 also comprises an upper hopper part 193, which is secured by bolts 194 to the top of the hopper part 190. The lower end of the hopper part 193 fits within the top edge region of the hopper part 90. The hopper part 193 has a rectangular horizontal section, with its sides converging downwardly. The top of the hopper part 190 is also rectangular and fits around the lower end of the hopper part 193. The delivery spouts 188 and 189 form separate parts and the top ends of these delivery spouts meet the rectangular top region of the hopper part 190. The walls of the lower parts of the delivery spouts 188 and 189, as will be apparent from FIG. 17 are steeper than the other wall parts of the hopper. The lower regions of the delivery spouts are shaped so that the lower ends form round floors 196, which are parallel to the distribution members 103 and 104 and are in line with one another at right angles to the shafts 148 and 149. Each of the floors 196 has two outlet ports 197 and 198, which are shown in FIG. 18 for the delivery spout 188. The delivery spouts 188 and 189 with the outlet ports 197 and 198 are disposed symmetrically with respect to the central plane 199 of the spreader. The plane 199 is parallel to the shafts 148 and 149 of the distribution members and extends in the normal direction of travel 119. The frame and the hopper are also symmetrical about the plane 199.

A dosing member 200 and 201 respectively is disposed beneath each of the floors 196 of the delivery spouts 188 and 189. These dosing members comprise substantially round, flat plates disposed adjacent the underside of the floors 196. The dosing members are supported by supporting lugs 202 provided at the lower ends of the spouts. The dosing members 200 and 201 are each provided with dosing openings 203 and 204, which co-operate with the outlet ports 197 and 198 and which are identical in shape and size to the latter. The dosing members 200 and 201 have tags 205 and 206 on their adjacent sides and these tags are pivotally coupled with coupling rods 207 and 208 respectively. The rods 207 and 208 are connected to an adjusting arm 209. The adjusting arm 209 is pivotable about a pivotal shaft 210 arranged on the frame. The adjusting arm 209 is one arm of a bell-crank lever, the other arm 212 of which is connected by a tie rod 213 to a control arm 214. The arm 214 is movable about a pivotal shaft 215 extending in the direction of travel 119. The control arm 214 can be fixed optionally in any one of a plurality of positions, being movable along a scale (not shown) for indicating the position of the dosing openings 203 and 204 relative to the outlet ports 197 and 198.

For use, the spreader is coupled by the coupling frame 122 with the lifting device of a tractor or a similar vehicle. The coupling pins 123 and 124 fastened to the lower lifting arms of the three-point lifting device of the tractor, and the coupling plates 125 are connected with the top arm of the three-point lifting device. In this way the spreader is connected by the coupling frame 122 with a vehicle which carries it and can travel, for example, across a field. The coupling frame 122 can be prevented from turning about the spigot 121 by inserting the locking pin 137 into one of the holes 132, 133 or 134. Usually the locking pin 137 will be in the hole 133 so that, when the pins 123 and 124 are at the same level as each other, the spreader with the distribution members 103 and 104 will be horizontal or parallel to the ground on which the vehicle carrying the spreader is standing. The coupling end 184 of the shaft 183 is connected by an auxiliary shaft with the power take-off shaft of the tractor so that the distribution members 103 and 104 can be rotated by the power take-off shaft in the direction of the arrows 166 and 167 via the transmission members in the gearboxes 118, 175 and 180.

The material to be spread is loaded into the hopper 102. During operation, the material flows out of the hopper through the delivery spouts 188 and 189, the outlet ports 197 and 198 and the dosing openings 203 and 204 of the dosing members 200 and 201 to the distribution members 103 and 104.

The spreader is particularly suitable for use as an agricultural machine, for example for spreading fertilizer or other granular and/or powdery materials on the land. The amount of material to be spread per unit area can be set by causing the outlet ports 197 and 198 of the delivery spouts to overlap the outlet ports 203 and 204 of the dosing members 200 and 201 to a greater or less extent. For this purpose, the dosing members 200 and 201 can be turned about the rotary axes 165 of the distribution members 103 and 104 by means of the control arm 214. By moving the control arm 214 into the desired position the dosing openings 203 and 204 can be adjusted at will to a given position to cover the outlet ports 197 and 198 to a greater or lesser extent so that the flow rate of material from the hopper to the distribution members 103 and 104 can be controlled. The positions of the openings 197 and 198 with respect to the rotary axes 165 of the distribution members, the size and shape of the distribution members and the shape of their ejection blades are determined in conjunction with the desired speed of rotation of the distribution members so that during operation the distribution members 103 and 104 eject the material over the same sector as each other. Each of the distribution members 103 and 104 spreads the material over substantially equal distances to both sides of the plane 199. The directions of rotation 166 and 167 are such that the adjacent sides of the two distribution members are moving forward with respect to the normal direction of travel 119.

The transmission members between the shafts 183 and the shafts 148 and 149 comprise the gear wheels 171, 172, 175, 174, 177, 178, 181, 182 and are selected and arranged so that the distribution members 103 and 104 rotate at speeds of 2000 rev/min with a driving speed of the shaft 183 of about 540 rev/min. At this speed, the diameters 155 can be small, for example from eighteen to thirty-five centimeters, preferably about twenty-six centimeters. Thus the spreader as a whole may be compact. It is advantageous to press the gearbox 118 from sheet steel, whereas the casings 175 and 180 are made of cast iron. The gearbox 118 constitutes a satisfactory support for the shafts 148 and 149 with the distribution members 103 and 104 mounted on them. Thus the manufacture of the spreader can be advantageously carried out at relatively low costs, and the spreader can be used in a simple manner under many various conditions. The high speed of rotation of the distribution members means that the material can be spread over a large total width of, for example, forty-eight meters. Because the spreader ejects material from two distribution members, the distribution of the material over this large width on coinciding sectors is such that the effective working width is twenty-four meters.

The weight of the spreader can also be low so that even low-power tractors may be used for spreading the material on the land. The gear wheels 181 and 182 are exchangeable wheels which can be interchanged and-/or be replaced by other gear wheels in order to change the speed of rotation of the distribution members 103 and 104 with the same driving speed of the shaft 183. The exchangeable wheels 181 and 182 are selected in dependence on the number of teeth which they have so that the speed of rotation of the distribution members 103 and 104 will be between, for example, 1000 rev/min and about 2000 rev/min. The intervals between available speeds lying in this range of 1000 and 2000 rev/min depends on the number of interchangeable gear wheels provided.

For the material to be spread in a satisfactory manner, it is important for the outlet ports 197 and 198 to be correctly positioned relatively to the distribution members. This can be ensured in a simple manner by providing the outlet ports 197 and 198 in the delivery spouts 188 and 189, which form part of a portion 190 of the hopper fixedly arranged in the frame. For this purpose the hopper part 190 is rigidly secured by welding to the supporting arms 112 and 113 or rigidly secured in a different manner to the frame 101. During manufacture, the location of the delivery spouts relative to the distribution members 103 and 104 can be correctly established. The distribution members 103 and 104 are fastened to the frame through their connection with the gearbox 118 and the carrying arms 116 and 117. This fixed disposition of the delivery spouts and of the ports provided in them with respect to the distribution members can be readily established during manufacture and will then be maintained during use of the spreader. The hopper part 193 can be readily fastened to the hopper part 190 during manufacture. The hopper part 193 may optionally be larger or smaller or its shape may be different as desired provided that the lower end of the hopper part 193 fits the top end of the hopper part 190, to which it has to be secured by the bolts 194.

It is also important, if the material is to be spread satisfactorily, for the material issuing from the outlet ports 197 and 198 to be supplied correctly to the distribution members, and in particular to the ejection blades 159 and 160. It is for this purpose that the distribution members 103 and 104 are provided with the feeding members 154, which are situated between the dosing members and the distribution members. The feeding members form a raised part on the central part of the discs 151. Each feeding member 154 has a diameter 155 which is such that their top faces 168, inclined at the angle 157, are situated beneath the outlet ports 197 and 198. The material dropping through the outlet ports onto the feeding members moves over the sloping top faces 168 of the feeding members to the exposed face nearest the rotary axis 165 of the distribution member concerned and to the part of the ejection blades adjoining the periphery of the feeding members. A good flow of material to the ejection blades 159 and 160 is obtained because the circumferential edge 161 is located approximately half way up the height 162 of the ejection blades, measured near the periphery of the feeding members 154. The material is thus received by the ejection blades in a manner which enables it to be very uniformly ejected and spread on the surface to be covered. The material flowing to the disc 151 over the outer edge regions 69 of the feeding members is guided by the rotation of the distribution members towards the ejection blades 159 and 160, which thus eject practically all of the material at their ends farthest from the shafts 148 and 149.

When using the spreader for spreading material over the desired width for equal distances on both sides of the plane 199, the distribution members 103 and 104 are parallel to the surface to be covered. This is done by inserting the pin 137 in the hole 133, the pins 123 and 124 being at right angles to the plane 199. If, for example, side strips of a field are to be covered, specific measures have to be taken to ensure the desired uniform distribution on these edges. This can be achieved in a simple manner by adjusting the spreader so that the distribution members 103 and 104 are slightly tilted relative to the surface to be covered so that they slope downwardly towards the side edge of the field to be covered. This adjustment of the distribution members 103 and 104 can be carried out by turning the part of the frame 101 carrying the distribution members 103 and 104 and the hopper 102 with respect to the coupling frame 122. This is done by removing the locking pin 137 from the hole 133, after which the spigot 121 can be turned inside the pivotal sleeve 127. This turning brings the hole 132 or the hole 134 into alignment with the locking pin 137, which can then be inserted into the hole 132 or the hole 134 depending on the required direction of tilt. In this manner uniform distribution of the material on the side strips of a field to be covered can be simply achieved. The spreader can remain connected to the tractor by means of the pins 123 and 124 and the plates 125, and no further adjustment of the spreader is needed. The positions of the holes 132 and 134 are arranged so that the distribution members 103 and 104 can be inclined at a desired angle with respect to the surface to be covered. The required angle of inclination of the spreader will typically be between 4° and 12° and will preferably be about 7° to 8°.

The tilting of practically the whole spreader with the distribution members 103 and 104 can be readily achieved while maintaining the position of the coupling pins 123 and 124 so that the lifting arms of the lifting device with which the spreader is coupled need not be displaced. The construction of which the coupling frame 122 as a part of the frame of the spreader can be turned with respect to the rest of the spreader can be advantageously manufactured when the size of the spreader can be small and its weight can be low. This is obtainable because of the high speed of rotation of the distribution members 103 and 104 about their rotary axes so that the distribution members as well as the transmission members between them and the shaft 183 can be small.

Adjustment of the dosing members 200 and 202 can be performed simply by means of the single control arm 214, which is coupled with the two dosing members. The coupling is such that the dosing members are always moved in synchronism and in a symmetrical manner with respect to the plane 199 to open or close to a greater or lesser extent the outlet ports 197 and 198 in the two delivery spouts 188 and 189. If it is desired for some reason, one of the dosing members 200 or 201 can be uncoupled from the control arm 214, for example by disconnecting the coupling rod 207 or 208 from the setting arm 209. Thus, for example, the ports 197 and 198 of one of the delivery spouts 188 or 189 can be kept closed by moving the dosing member 200 or 201 into the appropriate position, while the outlet ports in the other delivery spout can continue to feed the material to the distribution member disposed beneath the delivery spout concerned.

Figure 19:
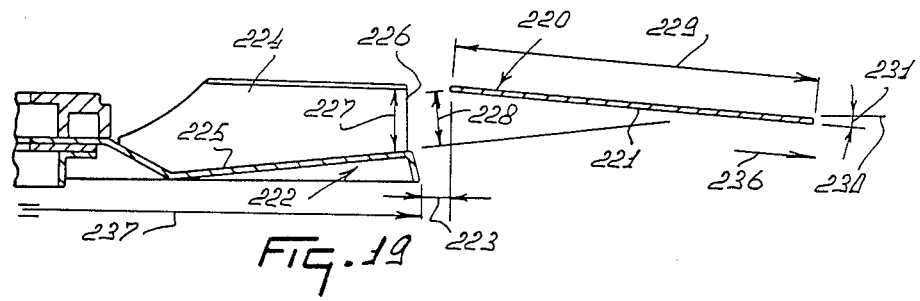
FIG. 19 is a sectional view showing a braking member.

FIG. 19 shows an embodiment of a deflecting or braking member 220 comprising a braking plate 221 disposed on at least part of the periphery of a spreading member 222. The spreading member 222 may correspond with the spreading members 11 or 12 of FIGS. 1 to 10. The braking member is spaced from the periphery of the spreading member by a distance 223 of a few centimeters. The spreading member comprises ejection blades 224 provided on an outwardly directed, slightly conical plate 225. The height 227 of the blades decreases towards their outer ends 226. During the operation of the spreader, the material is engaged by the blades of the spreading member and ejected from the ends 226 of the blades. The material will leave each blade approximately along the entire height 227 of the end 226. Thus the material is ejected in not too high a range 228. The ejected material impinges on the braking plate 221. The braking plate 221 is flat and is inclined at an angle 231 of a few degrees to the general direction 230 in which the material is reduced. The braking plate 221 has a length 229 for sufficiently braking the material ejected by the spreading member. The material striking the lower side of the braking plate 221 will slide along the plate 221 and thus dissipate some of the energy imparted by the spreading member. The material will then be ejected over a smaller distance than if the braking plate 221 were not there. The material is guided to some extent along the braking plate so that it leaves the braking plate in the direction of the arrow 236. The material ejected along the height 228 will be concentrated by its movement along the plate 221 so that it thus leaves the braking plate in a concentrated stream in the direction 236. The concentration of the material along the braking plate results in a more accurate limitation of the maximum distance over which the material can be spread. This is particularly important when the material has to be spread on a peripheral area 15. The braking plate 221 can co-operate effectively with the tilt of the spreader as described for any of the preceding embodiments.

Figure 21:
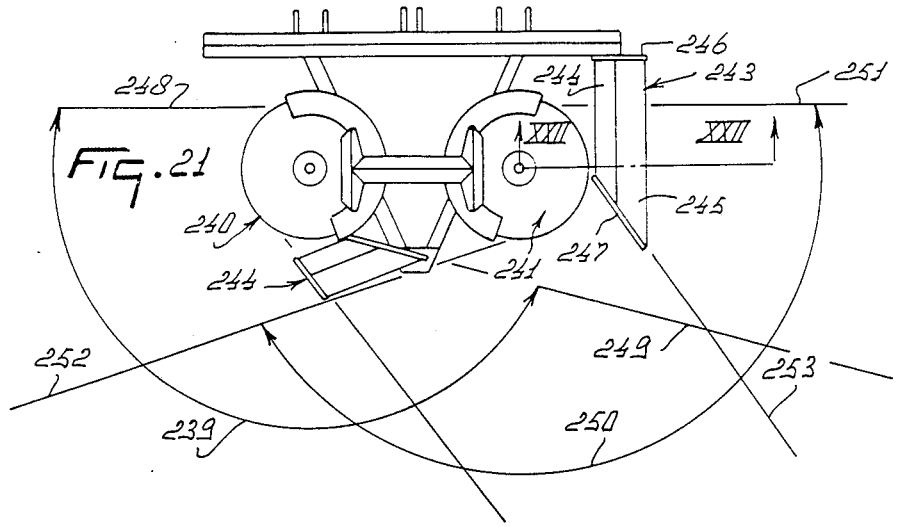
FIG. 21 is a schematic plan view of a spreader equipped with braking members.
Figure 22:
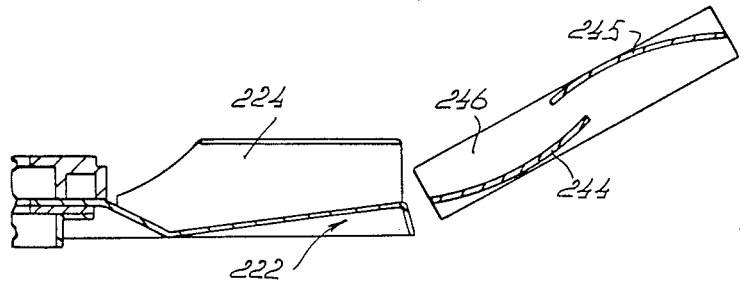
FIG. 22 is an enlarged sectional view taken on the line XXII—XXII in FIG. 21.

The braking plate 221 may be constructed so that the material ejected by the spreading member is braked to such an extent that the maximum ejection distance is reduced so that the material is not ejected further than the width 15 on one side of the spreader even in the normal horizontal position of the spreading members. Use of the braking member may, therefore, make it unnecessary to tilt the spreader so that the fastening members of the preceding embodiments are not required. The braking plate 221 then has such a length 229 and such a direction that the material is sufficiently braked along the braking plate so that it will not travel farther than the distance 15 of, for example, twelve meters. In this manner a distribution pattern of the kind shown in FIG. 5 can be obtained without tilting the spreader. The length 229 in this embodiment is about equal to half the diameter 237 of the spreading member. The braking plate 221 extends around only that part of the periphery of the spreading member which over material would otherwise be thrown for lateral distances greater than the desired distance 15. As shown in FIG. 19, the braking plate is positioned with its edge nearer the spreading member coplanar with the top edges of the ejection blades. The braking plate 221 deflects the direction of spread of the material in a slightly downwardly inclined direction.

A deflecting or braking plate 232 may also be arranged in the manner shown in FIG. 20. In this embodiment, the braking plate 232 is positioned with its edge nearer the periphery of the spreading member substantially at the same level as the lowermost point of the end 226 of a blade 224. The material ejected from the end of the blade 224 will strike and move over the top face of the braking plate 232. As a result of its movement along the braking plate 232, the ejected material loses some of its energy and leaves the braking plate 232 in the direction of the arrow 233 with reduced energy. The length 234 of the plate and its angle 235 of upward inclination away from the spreading member can be selected so that the energy loss of the material is such that it is spread laterally of the device at the most over the distance 15. The braking plates 221 and 232 are mounted movably on the frame of the spreader so that they can be moved out of the spreading path so that the material can be spread over the full width.

FIGS. 21 and 22 show embodiments of braking members 242 and 243 provided near two spreading members 240 and 241 of a spreader. The spreading members 240 and 241 correspond to the spreading members 11 and 12. The braking members 242 and 243 each comprise, as is shown for the braking member 243 in FIG. 22, two curved braking plates 244 and 245. The braking plate 244 receives material ejected by the spreading member 241 so that this material has to pass along the braking plate 244 and will thus lose some of its energy. The material moving along the braking plate 244 then engages the second braking plate 245, which is curved in the opposite direction from the braking plate 244. The material moves further along the plate 245 so that it will lose more of its kinetic energy. In this manner the kinetic energy of the material ejected to one side of the spreader can be reduced to such an extent that the material will not be spread laterally beyond the desired distance. The braking plates 244 and 245 may be mounted between vertical end plates 246 and 247. The braking member 242 is provided in the same manner with braking plates as the braking member 243 and so will not be described in detail. The braking member 243 is positioned near the periphery of the spreading member 241 so that only the material which would otherwise be spread laterally too far from the spreader is braked by the braking member 243. Without the braking members 242 and 243, the spreading members 240 and 241 eject the material in the same manner as is schematically shown in FIG. 3. Thus each of the spreading members ejects the material over the full width on each side of the spreader. The spreading member 240 spreads the material on a sector 239 between the outermost boundaries 248 and 249. The spreading member 241 ejects the material on a sector 250 between the outermost boundaries 251 and 252. When the braking members are in position, the end plate 247 of the braking member 243 is parallel to a spreading vector 253 along which unbraked material is spread on the surface over a maximum lateral distance which is equal to the desired distance 15. In the embodiment shown in FIGS. 21 and 22, the material ejected along the vector 253 will not be spread laterally beyond the distance 15 of twelve meters. The material ejected between the spreading vectors 251 and 253 will tend to be thrown farther than the desired distance 15, but is braked by the braking member 243 so that it is deposited on the surface to be covered within the desired lateral distance 15. The braking member 242 acts in the same manner on the material ejected by the spreading member 243 and which would otherwise be thrown beyond the desired distance on the right hand side of the spreader.

Figure 20:
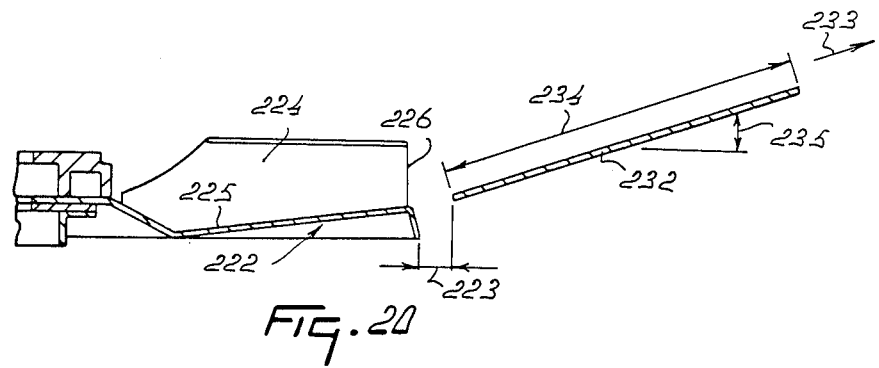
FIG. 20 corresponds to FIG. 19 but shows a different postion for the braking member.

As with the previous embodiments, the embodiments shown in FIGS. 19 to 22 do not require additional adjustments when spreading material on the strip 15 in the distribution pattern 18 of FIG. 5. In particular, the passage of the outlet ports of the hopper, through which the material is fed from the hopper to the spreading members, need not be changed. Since the flow rate of material through the outlet ports remains unchanged, the material is spread laterally of the spreader in accordance with the distribution pattern 18 of FIG. 5. Thus the embodiments of FIGS. 21 and 22, like the embodiments of FIGS. 19 and 20, provide an easily actuable device in which spreading over a shorter distance laterally of the spreader can be simply achieved by placing the braking members at the desired positions in the spreading paths around the periphery of the spreading members. The braking members need only be adjustable upwardly and downwardly and fixable in at least two positions relatively to the frame of the spreader for moving them into or out of their working positions (i.e. into or out of the spreading paths). After spreading on one side over a shorter distance the braking members can be removed, or moved out of the spreading paths, for spreading the material again over the full width.

The braking members 242 and 243 provide a good way of obtaining the desired distribution pattern 18 of FIG. 5, since the material moving substantially parallel to the spreading vector 253 passes at a different angle along the curvatures of the braking plates 244 and 245 than the material moving over the braking plates along the vector 251. The curvatures of the plates 244 and 245 can be selected to provide the required braking effect. Although in FIG. 22 the braking plates 244 and 245 are substantially identical, but curved in opposite senses, the plates may differ both in the direction of width and in their curvatures in order to obtain the desired braking effect and to change the direction in which the material leaves the braking plate 245.

Figure 23:
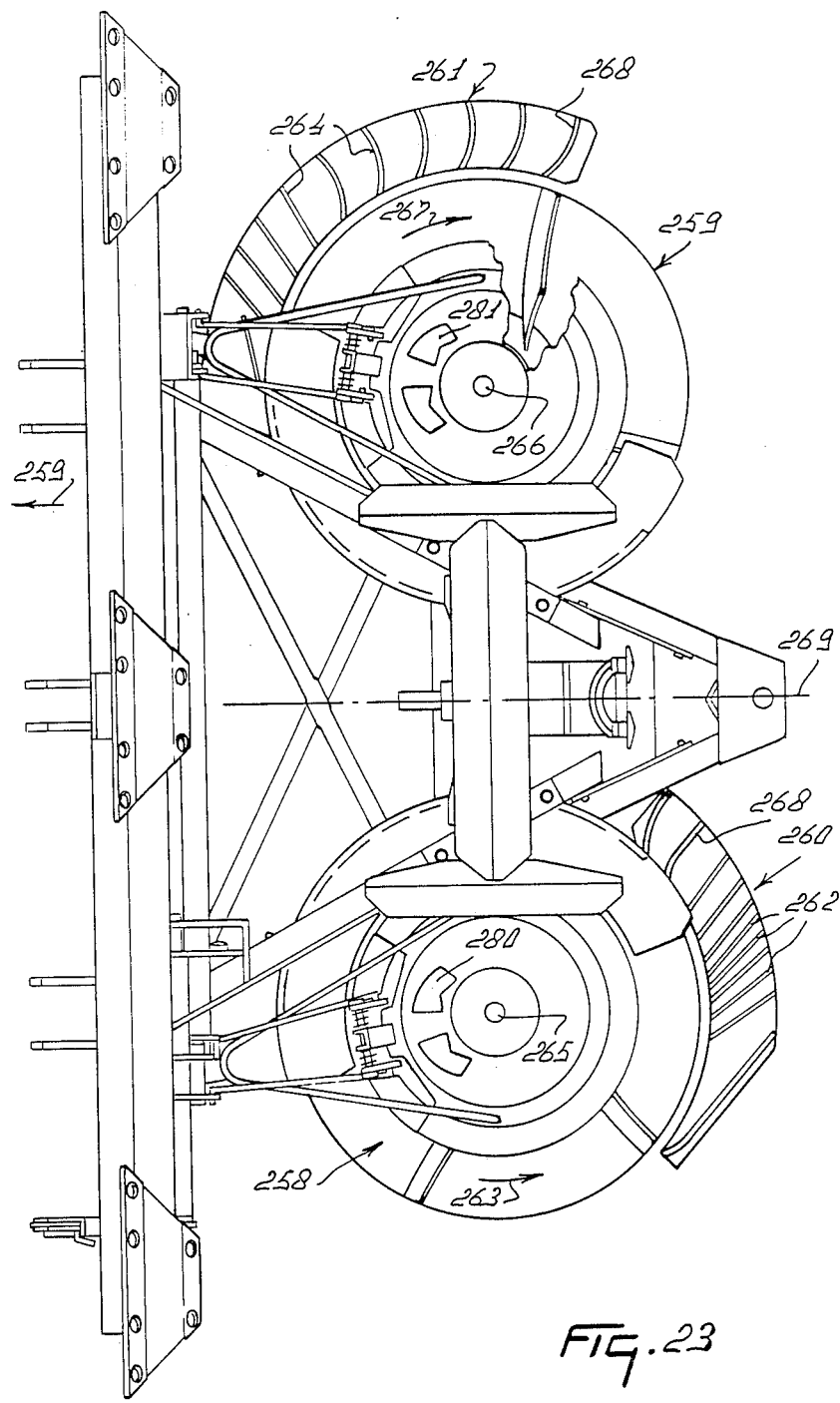
FIG. 23 is a plan view of a spreader provided with other forms of braking member.

FIG. 23 shows an embodiment of a spreader having spreading members 258 and 259. This spreader corresponds in many respects to the spreaders of the preceding embodiments. Around the spreading members 258 and 259 are arranged braking members 260 and 261 respectively. The braking member 260 covers that part of the periphery of the spreading member 258 from which, in the absence of the braking member, material would be spread laterally over a greater distance than the required distance, such as the distance 15 of FIG. 1. The braking member 260 comprises a plurality of plates 262 extending parallel to the axis 265 of the spreading member 258. The braking plates are disposed so that the material leaving the spreading member 258 strikes the braking plates of the braking member 260 with the result that the material is braked and is not spread laterally farther to the right than is required for covering the strip 15. The braking plates 262 are shaped and/or disposed one after another in the direction of rotation 263 of the spreading member 258 in a manner such that the braked material is uniformly distributed over the desired distance in accordance with the distribution pattern 18 of FIG. 5 on the strip 15. Also the spreading member 259 is surrounded by the braking member 261 so that material which would be spread, in the absence of a braking member, laterally farther than desired to cover only the strip 15 are braked so that material is ejected no farther than the distance 15. For this purpose the braking member 261 is provided with braking plates 264 positioned in the spreading path, some of which are straight and some of which are curved. The braking plates are parallel to the axis 266. In contrast to the braking plates of the embodiments shown in FIGS. 19 to 22, which deflect the material substantially in a vertical direction, the braking plates 262 and 264 deflect the material substantially in a horizontal direction during braking to reduce the energy. The braking plates 262 and 264 are struck by the material on the side opposite the direction of rotation of the spreading members 258 and 259. The braking plates 262 and 264 are thus struck by the material on the sides 268. The more sharply curved of the plates 264 will brake the material more so that the material ejected along these plates will lose a significant amount of energy so as to be spread only over the desired width 15. The spread on the sectors 239 and 250 in FIG. 21 and sectors 19 and 20 in FIG. 3 is further obtained by the position of the outlet ports such as the ports 280 and 281 respectively above the spreading members 258 and 259 respectively. The ports 280 and 281 are disposed symmetrically about the plane 269.

Figure 24:
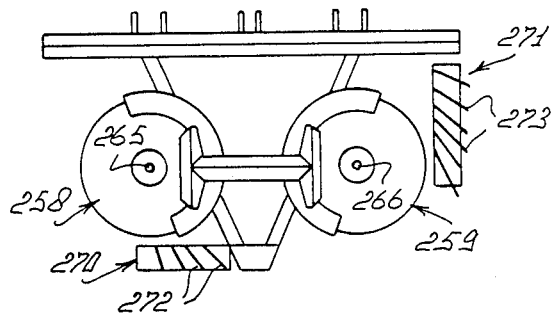
FIG. 24 is a schematic plan view of a spreader having yet another form of braking member.

FIG. 24 shows an embodiment in which spreading members corresponding with the spreading members 258 and 259 and designated by the same reference numerals are surrounded partly by braking members 270 and 271. These braking members 270 and 271 are both provided with straight braking plates 272 and 273 respectively, which are parallel to the rotary axes 265 and 266. The braking plates 272 and 273 are disposed so that the ejected material is affected in a different way than in the embodiment of FIG. 23 to reduce the speed. The material ejected by the spreading members is again braked to an extent such that it is not spread beyond the distance 15. The braking plates 272 and 273 are arranged in the paths of the material ejected by the spreading members 258 and 259 in a manner such that they reduce the speed of movement of this material so that the strip 15 is covered in accordance with the distribution pattern 18 of FIG. 5. The braking members shown in FIGS. 23 and 24 are arranged, of course, be movable into and out of the path of material, in order that the material can be selectively braked or unbraked.

Although various features of the spreaders described and illustrated in the drawings, will be set forth in the following claims as inventive features, the invention is not necessarily limited to these features and may encompass all inventive features disclosed both individually and in various combinations. In particular, braking members as disclosed in FIGS. 19 to 23 may be provided in spreaders of the type disclosed in FIGS. 1 to 18.

We claim:

1. A spreader for spreading material over a surface, comprising:
   a frame;
   spreading members which are movable about two respective upstanding axes to eject material to be spread in simultaneously broadcast arcuate patterns which coincide with each other substantially throughout; fastening means for mounting the spreader on a prime mover, said fastening means being adjustable upwardly and downwardly relative to said frame and further comprising a carrying arm which is pivotable with respect to said frame about a substantially horizontal pivotal axis, said carrying arm extending from said pivotal axis in the normal direction of operative travel of the spreader, said pivotal axis being substantially at right angles to said travel direction, said fastening means further comprising a coupling element which is situated in front of said pivotal axis with respect to said travel direction, said coupling element and said pivotal axis being on opposite sides of an upwardly extending member of said frame; and
   adjustment means of said frame for modifying the spreader's lateral inclination relative to the underlying ground so that the spreader can be disposed in a selected one of at least two laterally inclined operative conditions in which, on either lateral side of the spreader as selected, the material is broadcast simultaneously from said two spreading members substantially uniformly over up to about a fifty percent reduced spreading width on that lateral side and on the opposite side of the spreader material is broadcast simultaneously from said two spreading members substantially the same lateral distance as said material would have been broadcast from said spreader if said spreader was not inclined to any substantial extent in the lateral sense relative to the underlying ground.

2. A spreader as claimed in claim 1, wherein said carrying arm comprises two spaced, interconnected plates disposed one on each side of an upwardly extending frame member of said frame.

3. A spreader as claimed in claim 2, wherein said carrying arm is provided with a stationary stop.

4. A spreader as claimed in claim 1, wherein a locking pin comprises a removable stop for said fastening means.

5. A spreader for spreading material over a surface, comprising a frame and spreading members which are movable about two respective upstanding axes to eject material to be spread in simultaneously broadcast arcuate patterns which coincide with each other substantially throughout, the spreader further comprising fastening means for mounting the spreader on a carrier, said fastening means being adjustable upwardly and downwardly relative to said frame;
   adjustment means on said frame for modifying the spreader's lateral inclination relative to the underlying ground so that the spreader can be disposed in a selected one of at least two laterally inclined operative conditions in which on either lateral side of the spreader as selected the material is broadcast simultaneously from said two spreading members substantially uniformly over up to about a fifty percent reduced spreading width on that lateral side and on the opposite side of the spreader material is broadcast simultaneously from said two spreading members substantially the same lateral distance as said material would have been broadcast from said spreader is said spreader was not inclined to any substantial extent in the lateral sense relative to the underlying ground; and
   a locking pin which selectively secures said fastening means relative to said frame.

6. A spreader for spreading material over a surface comprising a frame and a spreading member which is movable about an axis to eject material to be spread laterally therefrom, the spreader comprising fastening means for mounting the spreader on a tractor's lifting device, and means on said frame that adapts the spreader selectively to assume a tilted operative condition in which on one side of the spreader the material is spread substantially uniformly over a reduced spreading width and on the other side of the spreader material is spread substantially as though said tilted operative condition was not assumed, said fastening means being adjustable upwardly and downwardly relative to said frame whereby the spreading member is tilted by said means that causes the spreader to assume said tilted operative condition, said fastening means comprising a carrier arm which is pivotable with respect to said frame about a substantially horizontal pivotal axis, said pivotal axis being substantially at right angles to the normal direction of operative travel of the spreader, said fastening means comprising a coupling element which is situated in front of said pivotal axis with respect to said travel direction, said coupling element and said pivotal axis being on opposite sides of an upwardly extending frame member of said frame.

7. A spreader as claimed in claim 6 wherein said carrying arm comprises two spaced, interconnected plates disposed one on each side of said upwardly extending frame member.

8. A spreader as claimed in claim 7 wherein said carrying arm is provided with a staionary stop.

9. A spreader for spreading material over a surface comprising a frame and a spreading member which is movable about an axis to eject material to be spread laterally therefrom, the spreader having fastening means for mounting the spreader on a tractor's lifting device, and means on said frame that adapt the spreader selectively to assume a tilted operative condition in which on one side of the spreader the material is spread substantially uniformly over a reduced spreading width and on the other side of the spreader material is spread substantially as before said tilted operative condition was assumed, said fastening means being adjustable upwardly and downwardly relative to said frame whereby the spreading member is tilted by said means that causes the spreader to assume said tilted operative condition, said fastening means being provided with an adjusting mechanism which interconnects said frame and said fastening means and is adapted to adjust at least part of said fastening means upwardly and downwardly with respect to said frame, said adjusting mechanism comprising a cylinder with a piston rod, said cylinder adapted to receive a pressurized fluid medium to adjust the position of said piston rod with respect to said cylinder, said cylinder and said piston rod comprising an assembly which is connected on one end to said frame and the other end to said fastening means.

10. A spreader as claimed in claim 9 wherein said cylinder is connected with a hydraulic circuit, said fluid medium being selectively supplied to said cylinder under pressure to lift the spreader with respect to a coupling point on said carrier.

11. A spreader as claimed in claim 10 wherein said adjusting mechanism is coupled with said fastening means near said coupling point where said fastening means is coupled with said carrier.

12. A spreader for spreading material over a surface, comprising a frame and a spreading member which is movable about an axis to eject material to be spread laterally therefrom, said frame including an upwardly extending frame member, the spreader having fastening means for mounting the spreader on an agricultural tractor's three-point lifting device, said fastening means comprises a carrying arm which is pivotable with respect to said frame about a substantially horizontal pivotal axis, said carrying arm comprising a coupling element through which said carrying arm is connectable to said tractor's three-point lifting device, said carrying arm being coupled with an adjusting mechanism which interconnects said carrying arm to said frame and is adapted to adjust said carrying arm upwardly or downwardly so as to bring said coupling element selectively in one of at least two different positions in height relative to said frame so that the spreader can selectively assume a laterally inclined operative condition in which on one side of the spreader material is spread therefrom substantially over a reduced spreading width and on the other side of the spreader material is spread therefrom substantially as it would have been spread if the spreader was not laterally inclined, said coupling element and said pivotal axis being on opposite sides of said upwardly extending frame member.

13. A spreader for spreading material over a surface, comprising a frame including an upwardly projecting member and two spreading members movable about axes in opposite senses and constructed so that each of the spreading members spreads at least substantially the whole width of a common broadcast pattern on the surface which is thus receiving material being spread simultaneously along the whole width of said broadcast pattern by both said spreading members while the spreader is traveling in its usual direction of operative travel, the spreader comprising fastening means for mounting the spreader on a tractor's three-point lifting device, said fastening means comprising a carrying arm which is pivotable with respect to said frame about a substantially horizontal pivotal axis, said carrying arm comprising a coupling element through which said carrying arm is connectable to said three-point lifting device, said carrying arm being coupled with an adjusting mechanism which interconnects carrier to said frame and is adapted to adjust said carrying arm upwardly or downwardly so as to bring said coupling element selectively in one of at least two different positions in height relative to said frame so that the spreader can be selectively adjusted to a laterally inclined operative condition in which on one side of the spreader material is spread therefrom substantially over a reduced spreading width and on the other side of the spreader material is spread therefrom substantially as though the spreader was not laterally inclined, said coupling element and said pivotal axis being on opposite sides of said upwardly projecting member.

14. A spreader for spreading material over a surface, comprising of a frame and spreading member which is movable about an axis to eject material to be spread laterally therefrom, the spreader having fastening means for mounting the spreader on a carrier, said fastening means comprising two carrying arms pivotally connected about a common pivot axis to said frame, said carrying arms being spaced apart transversely to the spreader's normal operative direction of travel, said carrying arms each having at a distance from their common said pivotal axis coupling means through which the spreader may be coupled to said carrier, said carrying arms each being coupled with an adjusting mechanism for adjusting said carrying arms upwardly or downwardly so as to bring said coupling means selectively in one of at least two different positions in height relative to said frame so that the spreader is adapted selectively to assume a normal operative condition in which material is spread therefrom over at least substantially equal distances on both sides of the spreader or a tilted position to one or the other side as selected in which the material is spread over a reduced spreading width to the selected said one or the other side of the spreader and material is spread from the spreader to the opposite side substantially as it does in said normal operative condition, each of said carrying arms providing an abutment fixed to the respective carrying arms to cooperate with stop means fixed to the said frame to hold the carrying arm in one operative position relative to the frame, further stop means being removably provided to each of said carrying arms to cooperate with another stop means fixed to said frame to hold the respective said carrying arm in another operative position relative to said frame.

15. A spreader for spreading material over a surface, comprising a frame and a spreading member which is movable about an axis to eject material to be spread laterally therefrom, the spreader comprising fastening means for mounting the spreader to a tractor's three-point lifting device, said fastening means comprising one carrying arm connected to said frame so as to be pivotable about a pivot axis, said carrying arm having at a distance from said pivot axis coupling means through which said carrying arm may be coupled to said tractor's three-point lifting device, said carrying arm being coupled with an adjusting mechanism disposed between said carrying arm and said frame which is adapted to adjust said coupling means of said carrying arm upwardly or downwardly so as to bring said coupling means selectively in one of three different positions in height relative to said frame in which the spreader is adapted selectively to assume a usual operative condition wherein material is being spread therefrom over at least substantially equal distances on both sides of the spreader or a tilted position to one or the other side wherein material is spread therefrom over a reduced spreading width to the said one or the said other side of the spreader as selected, while simultaneously material is being spread therefrom on the opposite side substantially as it was being spread in said usual operative condition.

16. A spreader as claimed in claim 15 comprising an abutment fixed to said carrying arm to cooperate with stop means fixed to said frame to hold said carrying arm in one operative position relative to said frame, further stop means removably provided in carrying arm to be brought selectively to at least one of two different positions relative to said carrying arm to cooperate with another stop means fixed to said frame to retain said carrying arm respectively in one of two different positions relative to said frame.

17. A spreader for spreading material over a surface, comprising: a frame and a spreading member which is movable about an axis to eject material to be spread laterally therefrom, the spreader further comprising fastening means for mounting the spreader on a tractor's lifting device, and means on said frame that adapt the spreader selectively to assume a tilted operative condition in which on one side of the spreader the material is spread substantially uniformly over a reduced spreading width and on the other side of the spreader material is spread substantially as before said tilted operative condition was assumed, said fastening means being adjustable upwardly and downwardly relative to said frame whereby said spreading member is tilted by said means thereby causing the spreader to assume said tilted operative condition, said fastening means being provided with an adjusting mechanism which interconnects said frame and said fastening means and is adapted to adjust at least part of said fastening means upwardly and downwardly with respect to said frame, said adjusting mechanism comprising an assembly which is connected on one end to said frame and the other end to said fastening means, which comprises a locking pin for fixing the fastening means in one of at least two positions relative to the frame.

* * * * *